(12) United States Patent
Graham

(10) Patent No.: US 12,194,620 B2
(45) Date of Patent: Jan. 14, 2025

(54) SELECTIVELY FLEXIBLE EXTENSION TOOL

(71) Applicant: Oliver Crispin Robotics Limited, Altrincham (GB)

(72) Inventor: Andrew Crispin Graham, Badminton (GB)

(73) Assignee: Oliver Crisipin Robotics Limited, Altrincham (GB)

( * ) Notice: Subject to any disclaimer, the term of this patent is extended or adjusted under 35 U.S.C. 154(b) by 986 days.

(21) Appl. No.: 16/577,268

(22) Filed: Sep. 20, 2019

(65) Prior Publication Data
US 2020/0114528 A1    Apr. 16, 2020

Related U.S. Application Data

(60) Provisional application No. 62/745,727, filed on Oct. 15, 2018.

(51) Int. Cl.
*B25B 33/00* (2006.01)
*B25J 9/10* (2006.01)
*B25J 18/02* (2006.01)
*B25J 18/06* (2006.01)

(52) U.S. Cl.
CPC ............. *B25J 18/06* (2013.01); *B25B 33/00* (2013.01); *B25J 9/104* (2013.01); *B25J 18/02* (2013.01); *B25J 18/025* (2013.01)

(58) Field of Classification Search
CPC ....... B25B 13/481; B25B 13/52; B25B 33/00; B25J 18/06; B25J 9/104; B25J 9/06; B25J 9/1045; B25J 18/02; B25J 18/025; B25J 19/00
See application file for complete search history.

(56) References Cited

U.S. PATENT DOCUMENTS

| 338,310 A | 3/1886 | Smith |
|---|---|---|
| 1,774,986 A | 9/1930 | Mackenzie |
| 1,987,972 A | 1/1935 | Rhein et al. |

(Continued)

FOREIGN PATENT DOCUMENTS

| CA | 2960352 | 9/2017 |
|---|---|---|
| CA | 2960352 A1 | 9/2017 |

(Continued)

OTHER PUBLICATIONS

FET20 (Wireless Borescope, Klein Tools, Jan. 2019) (Year: 2019).

(Continued)

*Primary Examiner* — Robert J Scruggs
(74) *Attorney, Agent, or Firm* — Fitch, Even, Tabin & Flannery LLP

(57) ABSTRACT

A selectively flexible extension tool includes a line assembly; and a plurality of sequentially arranged links, the line assembly operable with the plurality of sequentially arranged links to move the plurality of sequentially arranged links between a slacked position and a tensioned position, the plurality of sequentially arranged links spaced from one another when in the slacked position to allow the plurality of sequentially arranged links to pivotably move relative to one another, the plurality of sequentially arranged links pressed against one another when in the tensioned position to rigidly fix the plurality of sequentially arranged links to one another.

40 Claims, 18 Drawing Sheets

(56) References Cited

U.S. PATENT DOCUMENTS

| | | | |
|---|---|---|---|
| 2,073,903 A * | 3/1937 | O'Neil | B25B 23/00 |
| | | | 81/436 |
| 2,510,198 A | 6/1950 | Tesmer | |
| 2,974,676 A | 3/1961 | Hagelthorn | |
| 3,096,962 A | 7/1963 | Meijs | |
| 3,190,286 A | 6/1965 | Stokes | |
| 3,266,059 A * | 8/1966 | Stelle | B25J 9/06 |
| | | | 138/131 |
| 3,270,641 A | 9/1966 | Gosselin | |
| 3,583,393 A | 6/1971 | Takahashi | |
| 3,625,084 A | 12/1971 | Siebert | |
| 3,778,170 A | 12/1973 | Howell | |
| 4,035,137 A | 7/1977 | Arand | |
| 4,041,695 A | 8/1977 | Harper | |
| 4,095,418 A | 6/1978 | Mansson et al. | |
| 4,170,489 A | 10/1979 | Magnus et al. | |
| 4,215,979 A | 8/1980 | Morishita | |
| 4,227,584 A * | 10/1980 | Driver | E21B 4/16 |
| | | | 175/104 |
| 4,242,863 A | 1/1981 | Bailey | |
| 4,483,326 A | 11/1984 | Yamaka | |
| 4,625,936 A * | 12/1986 | Hadden, Sr. | F16M 11/40 |
| | | | 138/120 |
| 4,651,718 A | 3/1987 | Collins | |
| 4,655,673 A | 4/1987 | Hawkes | |
| 4,696,544 A | 9/1987 | Costella | |
| 4,703,888 A | 11/1987 | Kawamura et al. | |
| 4,713,120 A | 12/1987 | Hodgens, II et al. | |
| 4,714,339 A | 12/1987 | Lau | |
| 4,730,960 A | 3/1988 | Lewis et al. | |
| 4,735,501 A | 4/1988 | Ginsburgh | |
| 4,757,258 A | 7/1988 | Kelly, Jr. | |
| 4,773,395 A | 9/1988 | Suzuki | |
| 4,790,294 A | 12/1988 | Allred, III et al. | |
| 4,790,624 A | 12/1988 | Van Hoye | |
| 4,826,087 A | 5/1989 | Chinery | |
| 4,846,573 A | 7/1989 | Taylor | |
| 4,890,602 A | 1/1990 | Hake | |
| 4,911,206 A | 3/1990 | Gropp et al. | |
| 4,972,048 A | 11/1990 | Martin | |
| 4,991,565 A | 2/1991 | Takahashi | |
| 5,090,205 A | 2/1992 | Foster | |
| 5,102,221 A | 4/1992 | Desgranges | |
| 5,164,826 A | 11/1992 | Dailey | |
| 5,203,646 A | 4/1993 | Landsberger | |
| 5,254,809 A | 10/1993 | Martin | |
| 5,271,382 A | 12/1993 | Chikama | |
| 5,323,962 A | 6/1994 | Jassby | |
| 5,337,733 A | 8/1994 | Bauerfeind | |
| 5,339,845 A | 8/1994 | Huddas | |
| 5,372,162 A | 12/1994 | Frey | |
| 5,385,102 A | 1/1995 | Villedieu | |
| 5,390,402 A | 2/1995 | White | |
| 5,399,164 A | 3/1995 | Snoke | |
| 5,408,970 A | 4/1995 | Burkhard | |
| 5,482,029 A | 1/1996 | Sekiguchi | |
| 5,501,156 A | 3/1996 | Richter | |
| 5,558,665 A | 9/1996 | Kieturakis | |
| 5,644,394 A | 7/1997 | Owens | |
| 5,667,023 A * | 9/1997 | Harrell | E21B 43/305 |
| | | | 166/278 |
| 5,787,897 A * | 8/1998 | Kieturakis | A61B 17/0218 |
| | | | 606/1 |
| 5,807,241 A | 9/1998 | Heimberger | |
| 5,816,769 A | 10/1998 | Bauer et al. | |
| 5,842,381 A | 12/1998 | Feiten | |
| 6,123,273 A | 9/2000 | Loprinzo | |
| 6,156,974 A | 12/2000 | Blase | |
| 6,213,974 B1 | 4/2001 | Smith | |
| 6,216,439 B1 | 4/2001 | Nakamoto | |
| 6,287,206 B1 | 9/2001 | Stage | |
| 6,311,704 B1 | 11/2001 | Foster | |
| 6,371,148 B1 | 4/2002 | Tripp | |
| 6,431,824 B2 | 8/2002 | Schotsch | |
| 6,432,046 B1 | 8/2002 | Yarush | |
| 6,478,033 B1 | 11/2002 | Foster | |
| 6,481,195 B1 | 11/2002 | Blase | |
| 6,542,230 B1 | 4/2003 | Luke | |
| 6,643,877 B1 | 11/2003 | Amtenbrink | |
| 6,698,456 B2 | 3/2004 | Neubauer | |
| 6,783,491 B2 | 8/2004 | Saadat | |
| 6,837,846 B2 | 1/2005 | Jaffe | |
| 6,941,974 B2 | 9/2005 | Utaki | |
| 6,943,570 B2 | 9/2005 | Duffy | |
| 6,955,023 B2 | 10/2005 | Rotheroe | |
| 6,957,781 B2 | 10/2005 | Gowens et al. | |
| 6,974,411 B2 | 12/2005 | Belson | |
| 7,150,416 B2 | 12/2006 | Martin et al. | |
| 7,171,279 B2 | 1/2007 | Buckingham | |
| 7,182,024 B2 | 2/2007 | Pfeiffer | |
| 7,182,025 B2 | 2/2007 | Ghorbel | |
| 7,185,407 B2 | 3/2007 | Boyl-Davis | |
| 7,258,521 B2 | 8/2007 | Guerra | |
| 7,509,735 B2 | 3/2009 | Philip | |
| 7,543,518 B2 | 6/2009 | Buckingham | |
| 7,559,340 B2 | 7/2009 | Ikeda et al. | |
| 7,571,735 B2 | 8/2009 | Wagner | |
| 7,654,143 B2 | 2/2010 | Roney | |
| 7,662,091 B2 | 2/2010 | Bagley | |
| 7,677,181 B2 | 3/2010 | Boyl-Davis | |
| 7,703,272 B2 | 4/2010 | Wagner et al. | |
| 7,707,704 B2 | 5/2010 | Crocker | |
| 7,712,301 B1 | 5/2010 | Wagner | |
| 7,718,894 B2 | 5/2010 | Blase | |
| 7,741,563 B2 | 6/2010 | Harada et al. | |
| 7,849,878 B2 | 12/2010 | Kohler et al. | |
| 7,854,109 B2 | 12/2010 | Zubiate | |
| 7,883,674 B2 | 2/2011 | Huang | |
| 8,069,747 B2 | 12/2011 | Buckingham | |
| 8,096,030 B2 | 1/2012 | Graichen | |
| 8,100,031 B2 | 1/2012 | Zubiate | |
| 8,125,755 B2 | 2/2012 | Garcia | |
| 8,152,934 B2 | 4/2012 | Lee et al. | |
| 8,190,294 B2 | 5/2012 | Niclas | |
| 8,205,522 B2 | 6/2012 | Buckingham | |
| 8,206,488 B2 | 6/2012 | Mantkowski | |
| 8,299,785 B2 | 10/2012 | Bousquet | |
| 8,303,243 B2 | 11/2012 | Fish et al. | |
| 8,327,518 B2 | 12/2012 | Korner | |
| 8,374,722 B2 | 2/2013 | Buckingham | |
| 8,377,232 B2 | 2/2013 | Myers et al. | |
| 8,395,300 B2 | 3/2013 | Aabloo | |
| 8,400,501 B2 | 3/2013 | Heyworth | |
| 8,409,248 B2 | 4/2013 | Ginn | |
| 8,453,533 B2 | 6/2013 | Ryland | |
| 8,505,204 B2 | 8/2013 | Reverchon | |
| 8,571,711 B2 | 10/2013 | Jacobsen et al. | |
| 8,635,849 B2 | 1/2014 | Tassone et al. | |
| 8,640,531 B2 | 2/2014 | Remillard | |
| 8,674,222 B2 | 3/2014 | Hsieh | |
| 8,714,038 B2 | 5/2014 | Moran | |
| 8,758,232 B2 | 6/2014 | Graham et al. | |
| 8,786,848 B2 | 7/2014 | Hatcher | |
| 8,833,826 B2 | 9/2014 | Garcia | |
| 8,920,579 B2 | 12/2014 | Liedtke | |
| 8,945,096 B2 | 2/2015 | Zubiate | |
| 8,959,902 B2 | 2/2015 | Olivier et al. | |
| 8,991,163 B2 | 3/2015 | Olivier | |
| 8,992,421 B2 | 3/2015 | Stand et al. | |
| 8,998,567 B2 | 4/2015 | Scipio et al. | |
| 9,016,159 B2 | 4/2015 | Kell | |
| 9,016,293 B2 | 4/2015 | Battaglioli et al. | |
| 9,028,618 B2 | 5/2015 | Battaglioli et al. | |
| 9,127,234 B2 | 9/2015 | Hughes et al. | |
| 9,149,929 B2 | 10/2015 | Motzer | |
| 9,187,700 B2 | 11/2015 | Huang et al. | |
| 9,220,398 B2 | 12/2015 | Woodley | |
| 9,263,866 B2 | 2/2016 | Shimizu | |
| 9,272,425 B2 | 3/2016 | Garcia | |
| 9,294,737 B2 | 3/2016 | Hatcher, Jr. | |
| 9,300,926 B2 | 3/2016 | Kell | |
| 9,329,377 B2 | 5/2016 | Kell | |
| 9,389,150 B2 | 7/2016 | Kimpel, Jr. | |

(56) References Cited

U.S. PATENT DOCUMENTS

| | | |
|---|---|---|
| 9,399,299 B2 | 7/2016 | Hermey |
| 9,403,244 B2 | 8/2016 | Rautenberg |
| 9,409,292 B2 | 8/2016 | Smith |
| 9,435,750 B2 | 9/2016 | Matsumoto |
| 9,458,735 B1 | 10/2016 | Diwinsky |
| 9,492,906 B2 | 11/2016 | Rosing et al. |
| 9,505,125 B2 | 11/2016 | Zubiate |
| 9,549,663 B2 | 1/2017 | Larkin |
| 9,581,440 B2 | 2/2017 | Ruhge |
| 9,726,628 B2 | 8/2017 | Ruhge |
| 9,733,195 B2 | 8/2017 | Colletti |
| 9,778,141 B2 | 10/2017 | Bancalari |
| 9,788,141 B2 | 10/2017 | Ponec |
| 9,857,002 B2 | 1/2018 | Ott et al. |
| 9,902,024 B2 | 2/2018 | Ernst |
| 9,909,694 B2 | 3/2018 | Graham et al. |
| 9,951,647 B2 | 4/2018 | Rawson |
| 10,060,569 B2 | 8/2018 | Sivacoe |
| 10,085,624 B2 * | 10/2018 | Isoda ................ A61B 1/0057 |
| 10,197,473 B2 | 2/2019 | Diwinsky |
| 10,213,919 B2 | 2/2019 | Axinte et al. |
| 10,238,457 B2 | 3/2019 | Herrell |
| 10,265,810 B2 | 4/2019 | Diwinsky |
| 10,428,993 B2 | 10/2019 | Whitefield |
| 10,470,831 B2 | 11/2019 | Cohen |
| 10,488,349 B2 | 11/2019 | Sibbach |
| 10,775,315 B2 | 9/2020 | Mekala |
| 10,884,232 B1 | 1/2021 | Trivedi |
| 10,926,403 B1 | 2/2021 | Asokan |
| 10,962,345 B2 | 3/2021 | Graham |
| 10,967,504 B2 | 4/2021 | Simaan |
| 11,371,437 B2 | 6/2022 | Hawke |
| 11,707,819 B2 | 7/2023 | Graham |
| 11,752,622 B2 | 9/2023 | Graham |
| 11,787,069 B2 | 10/2023 | Curle |
| 12,091,981 B2 | 9/2024 | Foxall |
| 2003/0171736 A1 | 9/2003 | Bon |
| 2003/0229420 A1 | 12/2003 | Buckingham |
| 2004/0059191 A1 | 3/2004 | Krupa |
| 2004/0138525 A1 | 7/2004 | Saadat |
| 2004/0186350 A1 | 9/2004 | Brenneman |
| 2004/0193016 A1 | 9/2004 | Root |
| 2004/0249367 A1 * | 12/2004 | Saadat ................ A61B 1/2736 600/101 |
| 2004/0255422 A1 | 12/2004 | Reback |
| 2005/0075538 A1 | 4/2005 | Banik |
| 2005/0107667 A1 | 5/2005 | Danitz |
| 2005/0124856 A1 | 6/2005 | Fujikura |
| 2005/0148287 A1 | 7/2005 | Moeller |
| 2005/0203340 A1 | 9/2005 | Butler |
| 2005/0204489 A1 | 9/2005 | Velez |
| 2005/0273085 A1 | 12/2005 | Hinman |
| 2006/0073348 A1 | 4/2006 | Farmer et al. |
| 2006/0074283 A1 | 4/2006 | Henderson |
| 2006/0074383 A1 | 4/2006 | Boulais |
| 2006/0131908 A1 | 6/2006 | Tadano |
| 2006/0156851 A1 | 7/2006 | Jacobsen |
| 2006/0170386 A1 | 8/2006 | Anhalt |
| 2006/0258265 A1 | 11/2006 | Moeller |
| 2008/0066821 A1 | 3/2008 | Komiya et al. |
| 2008/0149141 A1 | 6/2008 | Sales |
| 2008/0161971 A1 | 7/2008 | Buckingham |
| 2008/0199304 A1 | 8/2008 | Moran |
| 2008/0218728 A1 | 9/2008 | Kirschner |
| 2008/0250769 A1 | 10/2008 | Wagner et al. |
| 2009/0084108 A1 | 4/2009 | Prociw et al. |
| 2009/0084408 A1 | 4/2009 | Thiemann |
| 2009/0084411 A1 | 4/2009 | Woodcock et al. |
| 2009/0086014 A1 | 4/2009 | Lea |
| 2009/0132085 A1 | 5/2009 | Sjostrand |
| 2009/0216245 A1 * | 8/2009 | Viola ................ A61B 1/00147 606/108 |
| 2009/0216374 A1 | 8/2009 | Low |
| 2009/0255102 A1 | 10/2009 | McMasters et al. |
| 2009/0255116 A1 | 10/2009 | McMasters et al. |
| 2009/0256007 A1 | 10/2009 | McMasters et al. |
| 2009/0320891 A1 | 12/2009 | Liedtke |
| 2010/0030377 A1 * | 2/2010 | Unsworth ............ F16M 11/18 700/245 |
| 2010/0037924 A1 | 2/2010 | Gebhardt et al. |
| 2010/0108107 A1 | 5/2010 | Mantkowski |
| 2010/0116292 A1 | 5/2010 | Wagner |
| 2010/0147330 A1 | 6/2010 | Kohler et al. |
| 2010/0160736 A1 | 6/2010 | Padget |
| 2010/0234988 A1 | 9/2010 | Buckingham |
| 2010/0256447 A1 | 10/2010 | Dubi |
| 2010/0275404 A1 | 11/2010 | Myers |
| 2011/0030381 A1 | 2/2011 | Sordyl |
| 2011/0112527 A1 | 5/2011 | Hamilton, Jr. |
| 2011/0174108 A1 | 7/2011 | Graham |
| 2011/0295427 A1 | 12/2011 | Motzer |
| 2011/0303053 A1 | 12/2011 | Schneider |
| 2011/0313243 A1 | 12/2011 | Zubiate |
| 2012/0067158 A1 | 3/2012 | Kell |
| 2012/0125164 A1 | 5/2012 | Kozak |
| 2012/0167547 A1 | 7/2012 | Zhang et al. |
| 2012/0184817 A1 | 7/2012 | Sugiyama |
| 2012/0197241 A1 * | 8/2012 | Golden ................ A61B 1/008 606/1 |
| 2012/0260497 A1 | 10/2012 | White |
| 2012/0279323 A1 | 11/2012 | Broda |
| 2012/0312103 A1 | 12/2012 | Hannott |
| 2013/0074879 A1 | 3/2013 | Battaglioli et al. |
| 2013/0125753 A1 | 5/2013 | Ono et al. |
| 2013/0192353 A1 | 8/2013 | Hatcher |
| 2013/0199040 A1 | 8/2013 | Dudeck |
| 2013/0226033 A1 | 8/2013 | Eskuri |
| 2013/0255410 A1 | 10/2013 | Lee |
| 2013/0335530 A1 | 12/2013 | Hatcher, Jr. |
| 2013/0340559 A1 | 12/2013 | Danitz et al. |
| 2014/0005683 A1 * | 1/2014 | Stand ................ A61B 34/71 606/130 |
| 2014/0012288 A1 | 1/2014 | Darisse |
| 2014/0055596 A1 * | 2/2014 | Hatcher, Jr. ............ H04N 7/185 348/82 |
| 2014/0069460 A1 | 3/2014 | Kell |
| 2014/0125791 A1 | 5/2014 | Arellano |
| 2014/0133269 A1 | 5/2014 | Hansen |
| 2014/0260755 A1 | 9/2014 | Dong |
| 2014/0371764 A1 | 12/2014 | Oyola |
| 2015/0032252 A1 | 1/2015 | Galluzzo |
| 2015/0036150 A1 | 2/2015 | Kobayashi |
| 2015/0064008 A1 | 3/2015 | Lewis |
| 2015/0159557 A1 | 6/2015 | Scipio et al. |
| 2015/0233263 A1 | 8/2015 | Battaglioli et al. |
| 2015/0246449 A1 | 9/2015 | Sakai |
| 2015/0300920 A1 | 10/2015 | Deascanis |
| 2015/0338353 A1 | 11/2015 | Bancalari |
| 2015/0341600 A1 | 11/2015 | Hatcher, Jr. |
| 2015/0360629 A1 | 12/2015 | Sekino |
| 2016/0000629 A1 | 1/2016 | Jackson |
| 2016/0031078 A1 | 2/2016 | Kapoor |
| 2016/0032761 A1 | 2/2016 | Griffiths et al. |
| 2016/0040803 A1 | 2/2016 | Steeger |
| 2016/0114488 A1 | 4/2016 | Mascorro Medina |
| 2016/0146036 A1 | 5/2016 | Richter |
| 2016/0174816 A1 | 6/2016 | Choset |
| 2016/0175057 A1 | 6/2016 | Ibach |
| 2016/0182776 A1 | 6/2016 | Huang |
| 2016/0186602 A1 | 6/2016 | Saenz |
| 2016/0262840 A1 | 9/2016 | Zubiate |
| 2016/0339584 A1 | 11/2016 | Esteban Finck |
| 2017/0023154 A1 | 1/2017 | Jaeker |
| 2017/0095922 A1 | 4/2017 | Licht |
| 2017/0100197 A1 | 4/2017 | Zubiate |
| 2017/0129110 A1 | 5/2017 | Ohm |
| 2017/0157719 A1 | 6/2017 | Diwinsky |
| 2017/0167289 A1 | 6/2017 | Diwinsky |
| 2017/0167953 A1 | 6/2017 | Diwinsky |
| 2017/0175569 A1 | 6/2017 | Rawson |
| 2017/0191376 A1 | 7/2017 | Eriksen et al. |
| 2017/0219814 A1 | 8/2017 | Letter |
| 2017/0219815 A1 | 8/2017 | Letter |
| 2017/0239762 A1 | 8/2017 | Roberts |

(56) References Cited

U.S. PATENT DOCUMENTS

| | | |
|---|---|---|
| 2017/0274484 A1 | 9/2017 | Roberts |
| 2017/0319048 A1 | 11/2017 | Ikeda |
| 2017/0328497 A1 | 11/2017 | Dantin |
| 2017/0359530 A1 | 12/2017 | Boudin |
| 2017/0361470 A1 | 12/2017 | Otero Del Real |
| 2018/0058233 A1 | 3/2018 | Norton |
| 2018/0071039 A1 | 3/2018 | Barnett |
| 2018/0094538 A1 | 4/2018 | Tibbetts et al. |
| 2018/0119568 A1 | 5/2018 | Negoescu |
| 2018/0149038 A1 | 5/2018 | Eriksen |
| 2018/0156062 A1 | 6/2018 | Dede |
| 2018/0156132 A1 | 6/2018 | Dede |
| 2018/0231162 A1 | 8/2018 | Zeng |
| 2018/0313225 A1 | 11/2018 | Millhaem et al. |
| 2018/0361960 A1 | 12/2018 | Yamamoto |
| 2019/0022877 A1 | 1/2019 | Akin |
| 2019/0046010 A1 | 2/2019 | Tojo |
| 2019/0054638 A1 | 2/2019 | Norton |
| 2019/0145498 A1 | 5/2019 | Yoon |
| 2019/0190190 A1 | 6/2019 | Bourgeas |
| 2019/0246878 A1 | 8/2019 | Bodner |
| 2019/0277770 A1 | 9/2019 | Mekala |
| 2019/0292938 A1 | 9/2019 | Wang |
| 2019/0308319 A1 | 10/2019 | Walters |
| 2019/0358813 A1 | 11/2019 | Graham |
| 2019/0358833 A1 | 11/2019 | Graham |
| 2019/0360794 A1 | 11/2019 | Graham |
| 2019/0366536 A1 | 12/2019 | Graham |
| 2019/0383158 A1 | 12/2019 | Diwinsky |
| 2019/0383161 A1 | 12/2019 | Graham |
| 2020/0113412 A1 | 4/2020 | Jensen |
| 2020/0114497 A1 | 4/2020 | Graham |
| 2020/0182345 A1 | 6/2020 | Gu |
| 2020/0205908 A1 | 7/2020 | Julian |
| 2020/0224552 A1 | 7/2020 | Millhaem |
| 2020/0316789 A1 | 10/2020 | Sohmshetty |
| 2020/0319119 A1 | 10/2020 | Peters |
| 2020/0359879 A1 | 11/2020 | Cahill |
| 2020/0405142 A1 | 12/2020 | Whitaker |
| 2021/0078165 A1 | 3/2021 | Tang |
| 2021/0102870 A1 | 4/2021 | Trivedi |
| 2021/0137354 A1 | 5/2021 | Bob |
| 2021/0223142 A1 | 7/2021 | Sasaki |
| 2021/0229269 A1 | 7/2021 | Graham |
| 2021/0229270 A1 | 7/2021 | Graham |
| 2021/0231239 A1 | 7/2021 | Graham |
| 2021/0285374 A1 | 9/2021 | Hawke |
| 2021/0388737 A1 | 12/2021 | Foxall |
| 2022/0221706 A1 | 7/2022 | Trivedi |
| 2022/0221707 A1 | 7/2022 | Trivedi |
| 2022/0290608 A1 | 9/2022 | Hawke |
| 2022/0314430 A1 | 10/2022 | Graham |
| 2023/0194234 A1 | 6/2023 | Graham |
| 2024/0011413 A1 | 1/2024 | Millheam |
| 2024/0280033 A1 | 8/2024 | Foxall |
| 2024/0326266 A1 | 10/2024 | Graham |

FOREIGN PATENT DOCUMENTS

| | | |
|---|---|---|
| CA | 3077622 A1 | 4/2019 |
| CA | 3043720 A1 | 11/2019 |
| CN | 86101283 | 8/1986 |
| CN | 86101283 A | 8/1986 |
| CN | 1162516 | 10/1997 |
| CN | 1050781 C | 3/2000 |
| CN | 1656312 | 8/2005 |
| CN | 1678937 | 10/2005 |
| CN | 1903517 | 1/2007 |
| CN | 101048101 | 10/2007 |
| CN | 101048102 | 10/2007 |
| CN | 101528111 A | 9/2009 |
| CN | 101881218 | 11/2010 |
| CN | 201769177 | 3/2011 |
| CN | 201800016 | 4/2011 |
| CN | 102292013 A | 12/2011 |
| CN | 102687057 | 9/2012 |
| CN | 102711585 | 10/2012 |
| CN | 102729240 A | 10/2012 |
| CN | 102871636 | 1/2013 |
| CN | 203370761 U | 1/2014 |
| CN | 103895012 A | 7/2014 |
| CN | 104175325 | 12/2014 |
| CN | 104582909 A | 4/2015 |
| CN | 103639156 B | 7/2015 |
| CN | 104870141 | 8/2015 |
| CN | 105144514 | 12/2015 |
| CN | 105377116 | 3/2016 |
| CN | 105436127 A | 3/2016 |
| CN | 105927820 | 9/2016 |
| CN | 106113019 | 11/2016 |
| CN | 106163431 | 11/2016 |
| CN | 106427289 A | 2/2017 |
| CN | 106659438 | 5/2017 |
| CN | 106988798 | 7/2017 |
| CN | 107205622 | 9/2017 |
| CN | 107468339 A | 12/2017 |
| CN | 108356747 | 8/2018 |
| CN | 108472025 | 8/2018 |
| CN | 207941781 | 10/2018 |
| CN | 108972527 | 12/2018 |
| CN | 109068938 | 12/2018 |
| CN | 109476019 | 3/2019 |
| CN | 109561935 | 4/2019 |
| CN | 109716194 | 5/2019 |
| CN | 110001286 | 7/2019 |
| CN | 110462169 | 11/2019 |
| CN | 110529254 | 12/2019 |
| CN | 110757412 | 2/2020 |
| CN | 111037602 | 4/2020 |
| CN | 111486008 | 8/2020 |
| CN | 113146599 | 7/2021 |
| CN | 113232042 | 8/2021 |
| DE | 3504824 | 8/1986 |
| DE | 4102211 | 8/1991 |
| DE | 29902753 U | 6/1999 |
| DE | 10160922 | 5/2003 |
| DE | 102019002892 A1 | 10/2020 |
| DE | 102020106508 | 9/2021 |
| EP | 1216797 | 6/2002 |
| EP | 1216797 A1 | 6/2002 |
| EP | 1489269 A2 | 12/2004 |
| EP | 1574675 A2 | 9/2005 |
| EP | 2011619 A2 | 1/2009 |
| EP | 1914010 A3 | 9/2010 |
| EP | 2237931 A1 | 10/2010 |
| EP | 2267508 | 12/2010 |
| EP | 1967295 B1 | 1/2011 |
| EP | 2320262 | 5/2011 |
| EP | 2052792 A3 | 6/2011 |
| EP | 2353739 A1 | 8/2011 |
| EP | 2375104 | 10/2011 |
| EP | 2286933 B1 | 11/2011 |
| EP | 2275648 B1 | 3/2012 |
| EP | 1903188 B1 | 5/2013 |
| EP | 2597273 A2 | 5/2013 |
| EP | 2629655 | 8/2013 |
| EP | 3061923 A1 | 8/2016 |
| EP | 3072642 A2 | 9/2016 |
| EP | 1908928 B1 | 12/2016 |
| EP | 3153604 A1 | 4/2017 |
| EP | 3176365 A1 | 6/2017 |
| EP | 3572632 | 11/2019 |
| EP | 3572632 A1 | 11/2019 |
| EP | 3879075 | 9/2021 |
| FR | 2956608 A1 | 8/2011 |
| FR | 2995996 A1 | 3/2014 |
| FR | 3082136 A1 | 12/2019 |
| GB | 779248 | 7/1957 |
| GB | 1437405 A | 5/1976 |
| GB | 2199842 | 7/1988 |
| GB | 2228644 | 8/1990 |
| GB | 2228644 A | 8/1990 |
| JP | H10146316 A | 6/1998 |
| JP | 2006184832 A | 7/2006 |

(56) References Cited

FOREIGN PATENT DOCUMENTS

| | | |
|---|---|---|
| JP | 2013510339 A | 3/2013 |
| MX | 2010013223 A1 | 12/2010 |
| NO | 162227 B | 8/1989 |
| TW | 201341090 | 10/2013 |
| WO | 9116598 A1 | 10/1991 |
| WO | 0006336 A1 | 2/2000 |
| WO | 2009081164 A1 | 7/2009 |
| WO | 2011092891 | 8/2011 |
| WO | 2012042921 A1 | 4/2012 |
| WO | 2012054829 | 4/2012 |
| WO | WO2012/054829 A2 | 8/2013 |
| WO | 2016063074 A2 | 4/2016 |
| WO | 2017037723 | 3/2017 |
| WO | 2017221982 A1 | 12/2017 |
| WO | 2018001967 A1 | 1/2018 |
| WO | 2019076876 | 4/2019 |
| WO | 2019076876 A1 | 4/2019 |
| WO | 2019097688 | 5/2019 |
| WO | 2021040376 A1 | 3/2021 |

OTHER PUBLICATIONS

Mascarenas et al., "A Compliant Mechanism for Inspecting Extremely Confined Spaces" Smart Materials and Structures, vol. No: 26, pp. 1-16, Oct. 26, 2017.
Mascarenas, et al., A compliant mechanism for inspecting extremely confined spaces, Smart Materials and Structures, Oct. 26, 2017, vol. 26, pp. 1-16.
U.S. Appl. No. 16/577,331; Notice of Allowance and Fees Due (PTOL-85) dated Jul. 25, 2022; (pp. 1-5).
U.S. Appl. No. 16/735,191; Non-Final Rejection dated Aug. 3, 2022; (pp. 1-11).
U.S. Appl. No. 16/750,665; Non-Final Rejection dated Jul. 20, 2022; (pp. 1-9).
U.S. Appl. No. 16/751,802; Final Rejection dated Jul. 28, 2022; (pp. 1-9).
European Search Report Corresponding to Application No. 19202826 dated Mar. 27, 2020.
U.S. Appl. No. 16/696,025, filed Nov. 26, 2019.
U.S. Appl. No. 16/750,665, filed Jan. 23, 2020.
U.S. Appl. No. 16/750,743, filed Jan. 23, 2020.
U.S. Appl. No. 16/751,802, filed Jan. 24, 2020.
U.S. Appl. No. 16/813,829, filed Mar. 10, 2020.
U.S. Appl. No. 16/898,629, filed Jun. 11, 2020.
U.S. Appl. No. 17/144,487, filed Jan. 8, 2021.
U.S. Appl. No. 15/986,958 filed 23MAY2018.
U.S. Final Office Action from U.S. Appl. No. 15/986,958 dated Sep. 9, 2020, 10 pgs.
U.S. Non-Final Office Action from U.S. Appl. No. 15/986,958 dated Apr. 23, 2020,12 pgs.
U.S. Notice of Allowance and Notice of Allowability, dated Nov. 18, 2020, from U.S. Appl. No. 15/986,958, 9 pgs.
U.S. Appl. No. 16/751,802; Non-Final Rejection dated Feb. 28, 2022; (pp. 1-12).
U.S. Appl. No. 16/750,743; Non-Final Rejection dated Apr. 27, 2022; (pp. 1-12).
U.S. Appl. No. 16/577,331; Non-Final Rejection dated Jan. 19, 2022; (pp. 1-8).
U.S. Appl. No. 16/696,025; Final Rejection dated Sep. 16, 2022; (pp. 1-34).
U.S. Appl. No. 16/751,802; Notice of Allowance and Fees Due (PTOL-85) dated Oct. 19, 2022; (pp. 1-7).
U.S. Appl. No. 16/898,629; Non-Final Rejection dated Sep. 13, 2022; (pp. 1-14).
European Search Report Corresponding to EP Application No. 181694589 dated Aug. 21, 2018.
Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.
Wickham et al., High Heat Flux Surface Coke Deposition and Removal Assessment, Technical Paper, Air Force Research Laboratory, Edwards AFB, Jan. 2015, California, 21 Pages.
U.S. Appl. No. 16/577,331; Notice of Allowance and Fees Due (PTOL-85) dated Nov. 7, 2022; (pp. 1-5).
U.S. Appl. No. 16/750,743; Final Rejection dated Nov. 7, 2022; (pp. 1-13).
U.S. Appl. No. 16/750,665; Notice of Allowance and Fees Due (PTOL-85) dated Nov. 17, 2022; (pp. 1-5).
U.S. Appl. No. 16/735,191; Notice of Allowance and Fees Due (PTOL-85) dated Dec. 8, 2022; (pp. 1-8).
U.S. Appl. No. 16/751,802; Supplemental Notice of Allowance dated Feb. 27, 2023; (pp. 1-4).
U.S. Appl. No. 16/577,331; Notice of Allowance and Fees Due (PTOL-85) dated Feb. 15, 2023; (pp. 1-5).
U.S. Appl. No. 16/696,025; Non-Final Rejection dated Mar. 28, 2023; (pp. 1-29).
U.S. Appl. No. 16/735,191; Notice of Allowance and Fees Due (PTOL-85) dated Mar. 27, 2023; (pp. 1-5).
U.S. Appl. No. 16/750,665; Notice of Allowance and Fees Due (PTOL-85) dated Mar. 24, 2023; (pp. 1-6).
U.S. Appl. No. 16/750,743; Notice of Allowance and Fees Due (PTOL-85) dated Jan. 23, 2023; (pp. 1-5).
U.S. Appl. No. 16/751,802; Notice of Allowance and Fees Due (PTOL-85) dated Feb. 6, 2023; (pp. 1-5).
U.S. Appl. No. 16/898,629; Final Rejection dated Feb. 28, 2023; (pp. 1-22).
U.S. Appl. No. 17/144,487; Final Rejection dated Jan. 11, 2023; (pp. 1-5).
U.S. Appl. No. 17/144,487; Non-Final Rejection dated Mar. 22, 2023; (pp. 1-6).
U.S. Appl. No. 17/219,577; Notice of Allowance and Fees Due (PTOL-85) dated Jan. 4, 2023; (pp. 1-5).
U.S. Appl. No. 16/577,331; Notice of Allowance and Fees Due (PTOL-85) dated May 26, 2023; (pp. 1-5).
U.S. Appl. No. 16/750,665; Notice of Allowance and Fees Due (PTOL-85) dated Aug. 7, 2023; (pp. 1-8).
U.S. Appl. No. 16/750,743; Notice of Allowance and Fees Due (PTOL-85) dated May 16, 2023; (pp. 1-5).
U.S. Appl. No. 16/898,629; Non-Final Rejection dated Jun. 7, 2023; (pp. 1-14).
U.S. Appl. No. 17/144,487; Final Rejection dated Jul. 20, 2023; (pp. 1-7).
U.S. Appl. No. 17/824,691; Notice of Allowance and Fees Due (PTOL-85) dated Jun. 21, 2023; (pp. 1-9).
U.S. Appl. No. 16/696,025; Final Rejection dated Dec. 28, 2023; (pp. 1-14).
U.S. Appl. No. 16/898,629; Final Office Action dated Oct. 10, 2023; (pp. 1-12).
U.S. Appl. No. 17/144,487; Non-Final Rejection dated Nov. 1, 2023; (pp. 1-15).
U.S. Appl. No. 17/824,691; Notice of Allowance and Fees Due (PTOL-85) dated Oct. 10, 2023; (pp. 1-8).
U.S. Appl. No. 16/898,629; Notice of Allowance and Fees Due (PTOL-85) dated Jan. 17, 2024; (pp. 1-7).
U.S. Appl. No. 17/144,487; Final Rejection dated Feb. 12, 2024; (pp. 1-5).
Bakhshi, M et al., Tunnel Segmental Lining Geometry, Tolerance and Measurement, Tunnelling & Trenchless Conference, 2018, 10 pp.
International Search Report Corresponding to Application No. PCT/US2019/037022 on Nov. 15, 2019.
U.S. Appl. No. 15/812,004, filed Nov. 14, 2017.
U.S. Appl. No. 15/914,469, filed Mar. 7, 2018.
USPTO; U.S. Appl. No. 16/008,475; Final Rejection mailed Mar. 2, 2023; (pp. 1-21).
USPTO; U.S. Appl. No. 16/008,475; Final Rejection mailed Aug. 4, 2022; (pp. 1-8).
USPTO; U.S. Appl. No. 16/008,475; Final Rejection mailed Dec. 15, 2023; (pp. 1-24).
USPTO; U.S. Appl. No. 16/008,475; Non-Final Rejection mailed Apr. 22, 2024; (pp. 1-33).

(56) References Cited

OTHER PUBLICATIONS

USPTO; U.S. Appl. No. 16/008,475; Non-Final Rejection mailed Jun. 15, 2023; (pp. 1-23).
USPTO; U.S. Appl. No. 16/008,475; Non-Final Rejection mailed Oct. 21, 2022; (pp. 1-18).
USPTO; U.S. Appl. No. 16/696,025; Non-Final Rejection mailed May 7, 2024; (pp. 1-25).
USPTO; U.S. Appl. No. 17/144,435; Non-Final Rejection mailed Mar. 11, 2024; (pp. 1-12).
USPTO; U.S. Appl. No. 17/144,487; Non-Final Rejection mailed Apr. 18, 2024; (pp. 1-12).
USPTO; U.S. Appl. No. 17/552,848; Requirement for Restriction/Election mailed Feb. 26, 2024; (pp. 1-8).
USPTO; U.S. Appl. No. 18/328,076; Non-Final Rejection mailed Feb. 27, 2024; (pp. 1-14).
USPTO; U.S. Appl. No. 17/552,848; Non-Final Rejection mailed Jun. 21, 2024; (pp. 1-38).
USPTO; U.S. Appl. No. 16/898,629; Notice of Allowance and Fees Due (PTOL-85) mailed Aug. 2, 2024; (pp. 1-5).
USPTO; U.S. Appl. No. 16/696,025; Final Rejection mailed Aug. 13, 2024; (pp. 1-25).
USPTO; U.S. Appl. No. 16/008,475; Final Rejection mailed Nov. 4, 2024; (pp. 1-50).
USPTO; U.S. Appl. No. 17/144,487; Final Rejection mailed Sep. 18, 2024; (pp. 1-14).
USPTO; U.S. Appl. No. 17/552,848; Final Rejection mailed Oct. 28, 2024; (pp. 1-23).
USPTO; U.S. Appl. No. 18/328,076; Final Rejection mailed Sep. 24, 2024; (pp. 1-12).

* cited by examiner

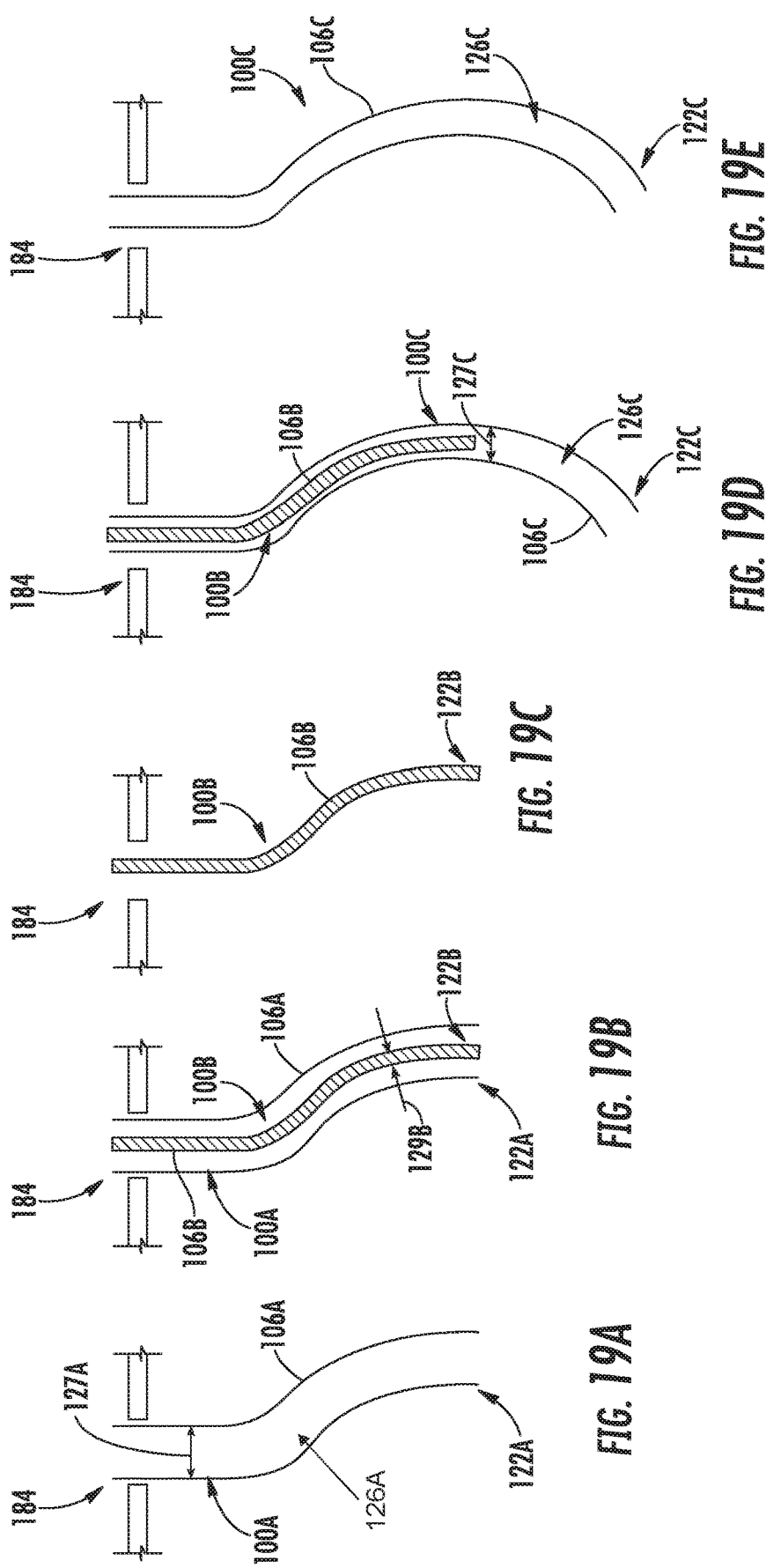

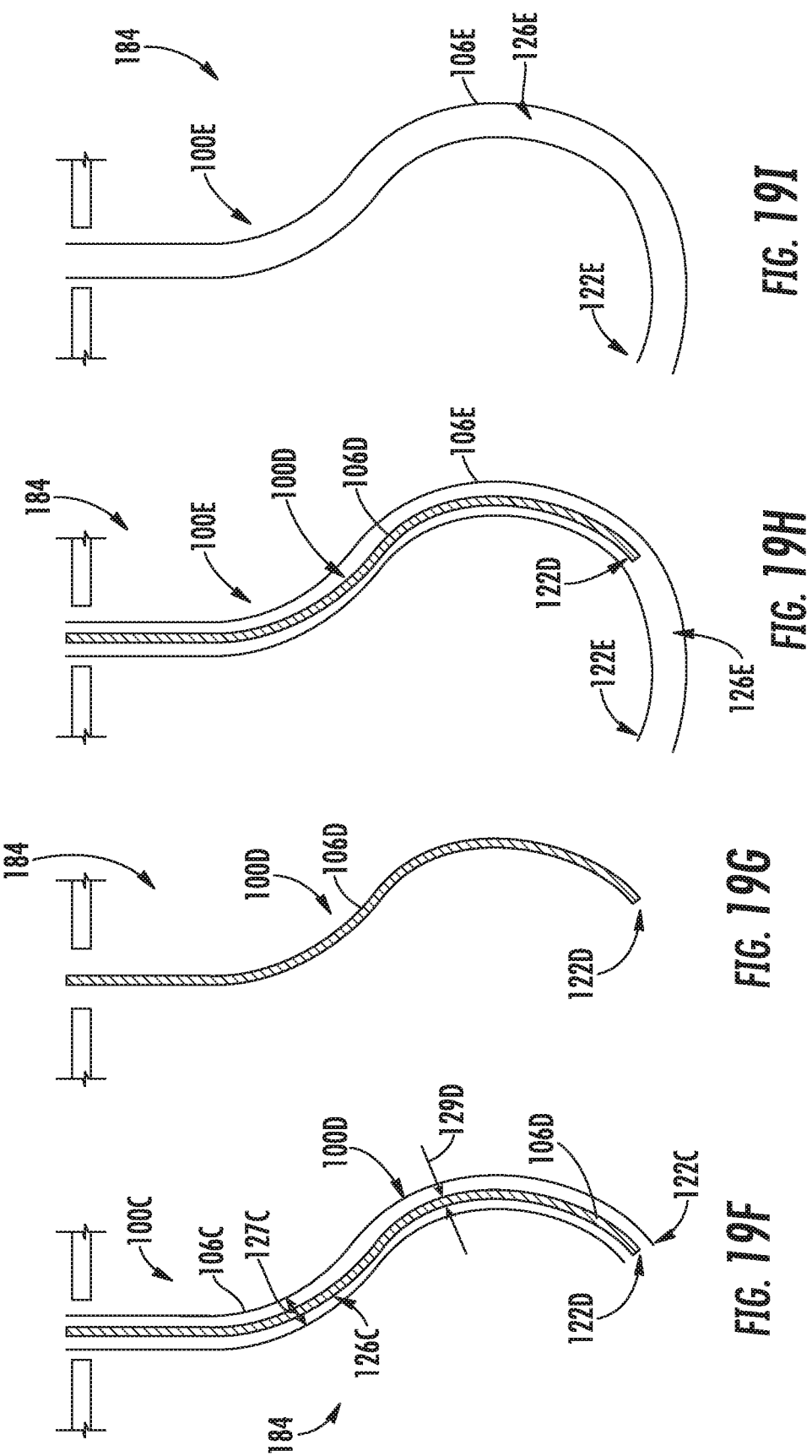

SELECTIVELY FLEXIBLE EXTENSION TOOL

CROSS-REFERENCE TO RELATED APPLICATIONS

This application is a Non-Provisional Application claiming the benefit of priority under 35 U.S.C. § 119(e) to U.S. Provisional Application No. 62/745,727, filed Oct. 15, 2018, which is hereby incorporated by reference in its entirety.

FIELD

The present subject matter relates generally to a selectively flexible extension tool and a method for using the same.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

In such a manner, robotic arms may be useful in reaching out-of-sight locations within various environments. However, robotic arms may generally be cost prohibitive and/or more complicated than desired for certain applications. Accordingly, a tool that may allow for a user to reach remote locations within an environment in a more cost efficient manner would be useful.

BRIEF DESCRIPTION

Aspects and advantages of the invention will be set forth in part in the following description, or may be obvious from the description, or may be learned through practice of the invention.

In one exemplary embodiment of the present disclosure, a selectively flexible extension tool is provided. The selectively flexible extension tool includes a line assembly; and a plurality of sequentially arranged links, the line assembly operable with the plurality of sequentially arranged links to move the plurality of sequentially arranged links between a slacked position and a tensioned position, the plurality of sequentially arranged links spaced from one another when in the slacked position to allow the plurality of sequentially arranged links to pivotably move relative to one another, the plurality of sequentially arranged links pressed against one another when in the tensioned position to rigidly fix the plurality of sequentially arranged links to one another.

In certain exemplary embodiments the plurality of sequentially arranged links includes a first link extending between a forward end and an aft end and a second link extending between a forward end and an aft end, the forward end of the first link defining a first interface geometry, the aft end of the second link defining a second interface geometry complementary to the first interface geometry.

In certain exemplary embodiments the line assembly includes a first line slidable relative to at least the first link to move the plurality of sequentially arranged links between the slacked position and the tensioned position.

For example, in certain exemplary embodiments the first link defines a first geometry, wherein the second link defines a second geometry, and wherein the first geometry and the second geometry are substantially the same.

For example, in certain exemplary embodiments the first link defines a first geometry, wherein the second link defines a second geometry, and wherein the first geometry is different than the second geometry.

For example, in certain exemplary embodiments the first interface geometry defines a circumference and comprises at least two extension members spaced along the circumference, wherein the second interface geometry also defines a circumference and comprises at least two indentions corresponding in shape to the at least two extension members.

For example, in certain other exemplary embodiments the at least two extension members of the first interface geometry comprises three extension members, and wherein the at least two indentions of the second interface geometry comprises three corresponding indentions.

For example, in certain other exemplary embodiments the at least two extension members of the first interface geometry are pressed within the at least two indentions of the second interface geometry when the plurality of links is in the tensioned position.

For example, in certain exemplary embodiments the flexible extension tool further includes a biasing member operable with the first link and the second link for biasing the second link away from the first link, and wherein the line assembly is configured to overcome the biasing member when moving the plurality of links to the tensioned position.

For example, in certain other exemplary embodiments the biasing member is an elastic member positioned at least partially between the first link and the second link.

For example, in certain other exemplary embodiments each of the plurality of links defines an outer surface, and wherein the biasing member is a spring attached to the outer surface of the first link and the outer surface of the second link for biasing the second link away from the first link.

For example, in certain other exemplary embodiments each of the plurality of links defines an outer surface, and wherein the biasing member is a spring positioned inward of the outer surface of the first link and inward of the outer surface of the second link.

In certain exemplary embodiments the flexible extension tool further includes a plurality of biasing members, wherein each biasing member is operable with a pair of adjacent links of the plurality of links for biasing the adjacent links away from one another.

In certain exemplary embodiments the flexible extension tool further includes a biasing member operable with each of the plurality of links for biasing adjacent links away from one another, wherein each of the plurality of links defines an outer surface, and wherein the biasing member is operable with the outer surface of each of the plurality of links.

For example, in certain exemplary embodiments the biasing member includes an elastomeric material attached to the outer surface of each of the plurality of links.

For example, in certain exemplary embodiments the biasing member comprises a continuous spring member attached to the outer surface of each of the plurality of links.

In certain exemplary embodiments each of the plurality of links defines a substantially similar geometry.

In certain exemplary embodiments each of the plurality of links is formed through an additive manufacturing process.

In certain exemplary embodiments the selectively flexible extension tool is a guide tube, and wherein the plurality of links together define a hollow tube extending therethrough.

In certain exemplary embodiments the selectively flexible extension tool is a tool member further comprising a tool implement coupled to one of the plurality of links.

For example, in certain exemplary embodiments the tool implement includes a drill, and wherein the selectively flexible extension tool comprises a flexible driveshaft extending through the plurality of links.

For example, in certain exemplary embodiments the tool implement comprises one or more sensors, a camera, or both.

In certain exemplary embodiments each of the plurality of links includes a circumferential wall, wherein the line assembly includes a first line, and wherein the first line of the line assembly extends through the circumferential wall of each of the plurality of links.

For example, in certain exemplary embodiments each link of the plurality of links defines a lengthwise opening in the circumferential wall, and wherein the first line of the line assembly is slidably received through the lengthwise opening of the circumferential wall of each link of the plurality of links.

In certain exemplary embodiments the line assembly includes a plurality of lines operable with the plurality of links.

In certain exemplary embodiments the plurality of sequentially arranged links is a first plurality of sequentially arranged links defining a first guide tube extending therethrough, and wherein the selectively flexible extension tool further includes a second plurality of sequentially arranged links movably positioned at least partially within the first guide tube of the first plurality of sequentially arranged links.

For example, in certain exemplary embodiments the line assembly includes a first line operable with the first plurality of sequentially arranged links to move the first plurality of sequentially arranged links between a slacked position and a tensioned position, and a second line operable with the second plurality of sequentially arranged links to move the second plurality of sequentially arranged links between a slacked position and a tensioned position.

For example, in certain exemplary embodiments the second plurality of sequentially arranged links together define a second guide tube extending therethrough, and wherein the selectively flexible extension tool further includes a third plurality of sequentially arranged links movably positioned at least partially within the second guide tube of the second plurality of sequentially arranged links.

In certain exemplary embodiments the plurality of sequentially arranged links defines is a first plurality of sequentially arranged links defining a forward end, and wherein the selectively flexible extension tool further includes a second plurality of sequentially arranged links coupled to the forward end of the first plurality of sequentially arranged links.

For example, in certain exemplary embodiments the line assembly includes a first line operable with the first plurality of sequentially arranged links to move the first plurality of sequentially arranged links between a slacked position and a tensioned position, and a second line operable with the second plurality of sequentially arranged links to move the second plurality of sequentially arranged links between a slacked position and a tensioned position, and wherein the second line is operable with the second plurality of sequentially arranged links independent of the first line being operable with the first plurality of sequentially arranged links.

In another exemplary aspect of the present disclosure, a method for operating a selectively flexible extension tool within an environment defining a nonlinear path is included. The method includes inserting a plurality of sequentially arranged links of the selectively flexible extension tool at least partially into the nonlinear path of the environment while the plurality of sequentially arranged links of the selectively flexible extension tool are in a slacked position; and tensioning a line of a line assembly operable with the plurality of sequentially arranged links to move the plurality of sequentially arranged links to a tensioned position to rigidly fix the plurality of sequentially arranged links to one another.

In certain exemplary aspects the method further includes inserting a tool implement through a guide tube defined by the plurality of sequentially arranged links in the tensioned position to access the environment.

In certain exemplary aspects the plurality of sequentially arranged links of the extension tool is a first plurality of sequentially arranged links, wherein the extension tool further includes a second plurality of sequentially arranged links, wherein the second plurality of sequentially arranged links is movable between a retracted position wherein the second plurality of sequentially arranged links is substantially nested within the first plurality of sequentially arranged links and an extended position wherein the second plurality of sequentially arranged links is substantially extended from within the first plurality of sequentially arranged links, and wherein the second plurality of sequentially arranged links is further movable between a slacked position and a tensioned position.

For example, in certain exemplary aspects inserting the plurality of sequentially arranged links of the selectively flexible extension tool includes inserting the first plurality of sequentially arranged links into the nonlinear path of the environment while the second plurality of sequentially arranged links is in the retracted position and the slacked position.

For example, in certain other exemplary aspects tensioning the line of the line assembly includes tensioning a first line of the line assembly, and wherein the method further includes moving the second plurality of sequentially arranged links to the extended position subsequent to tensioning the first line of the line assembly.

For example, in certain other exemplary aspects the method further includes tensioning a second line of the line assembly operable with the second plurality of sequentially arranged links to rigidize the second plurality of sequentially arranged links and rigidly fix the second plurality of sequentially arranged links to one another.

In certain exemplary aspects the plurality of sequentially arranged links of the extension tool is a first plurality of sequentially arranged links, wherein the extension tool further includes a second plurality of sequentially arranged links, wherein the line of the line assembly is a first line of the line assembly, wherein the line assembly further includes a second line operable with the second plurality of sequentially arranged links, and wherein the method further includes tensioning the second line of the line assembly to move the second plurality of sequentially arranged links to a tensioned position to rigidize the second plurality of sequentially arranged links and rigidly fix the second plurality sequentially arranged links to one another independently from the tensioning of the first line of the line assembly.

For example, in certain exemplary aspects the first plurality of sequentially arranged links defines a forward end, wherein the second plurality of sequentially arranged links defines an aft end, and wherein the aft end of the second plurality of sequentially arranged links is coupled to the forward end of the first plurality of sequentially arranged links.

In another exemplary embodiment of the present disclosure, a tool assembly is provided. The tool assembly includes a first selectively flexible tool including a first plurality of sequentially arranged links moveable between a slacked position and a tensioned position; and a second selectively flexible tool including a second plurality of sequentially arranged links moveable between a slacked position and a tensioned position, the second plurality of sequentially arranged links moveable over or through the first plurality of sequentially arranged links.

In certain exemplary embodiments the first selectively flexible tool defines a first outer diameter, wherein the second plurality of sequentially arranged links of the second selectively flexible tool define a second hollow tube defining a second inner diameter, wherein the first outer diameter of the first selectively flexible tool is less than the second inner diameter of the second hollow tube of the second plurality of sequentially arranged links such that the second plurality of sequentially arranged links of the second selectively flexible tool are moveable over the first plurality of sequentially arranged links of the first selectively flexible tool.

In certain exemplary embodiments the first plurality of sequentially arranged links of the first selectively flexible tool are spaced from one another when in the slacked position to allow the plurality of sequentially arranged links to pivotably move relative to one another, and wherein the plurality of sequentially arranged links are pressed against one another when in the tensioned position to rigidly fix the first plurality of sequentially arranged links to one another.

In certain exemplary embodiments the first selectively flexible tool further includes a line operable with the first plurality of sequentially arranged links to move the first plurality of sequentially arranged links between a slacked position and a tensioned position.

In certain exemplary embodiments the second plurality of sequentially arranged links of the second selectively flexible tool includes a plurality of joint members and a plurality of link members, wherein each joint member is positioned between adjacent link members.

For example, in certain exemplary embodiments each of the plurality of joint members defines a first longitudinal opening, wherein each of the plurality of link members defines a second longitudinal opening, and wherein the second selectively flexible tool further includes a line assembly extending through the first longitudinal opening of each joint member of the plurality of joint members and further extending through the second longitudinal opening of each link member of the plurality of link members.

For example, in certain other exemplary embodiments the first longitudinal opening of each joint member extends through a joint member centerline of the respective joint member, and wherein the second longitudinal opening of each link member extends through a link member centerline of the respective link member.

For example, in certain other exemplary embodiments each of the plurality of joint members extends between a first end and a second end, and wherein the first end and second end of each joint member defines a convex surface.

For example, in certain other exemplary embodiments each link member of the plurality of link members extends between a first end and a second end, and wherein the first end and second end of each link member defines a concave opening mateable with a convex surface of an adjacent joint member.

For example, in certain other exemplary embodiments each of the plurality of joint members defines a substantially spherical shape, and wherein each of the plurality of link members defines a substantially cylindrical shape.

In another exemplary embodiment of the present disclosure, a method for operating a tool assembly within an environment is provided. The method includes inserting a first selectively flexible tool into the environment while the first selectively flexible tool is in a slacked position; moving the first selectively flexible tool to a tensioned position; positioning a second selectively flexible tool at least partially over or through the first selectively flexible tool while the second selectively flexible tool is in a slacked position; and moving the second selectively flexible tool to a tensioned position.

In certain exemplary aspects inserting the first selectively flexible tool into the environment includes inserting a first plurality of links of the first selectively flexible tool while the first plurality of links is in a slacked position, and wherein moving the first selectively flexible tool to the tensioned position includes moving the first plurality of links of the first selectively flexible tool to a tensioned position.

For example, in certain exemplary aspects the first plurality of links of the first selectively flexible tool define a hollow tube extending therethrough when in the tensioned position, and wherein positioning the second selectively flexible tool at least partially over or through the first selectively flexible tool includes positioning the second selectively flexible tool at least partially through the hollow tube of the first plurality of links of the first selectively flexible tool.

In certain exemplary aspects positioning the second selectively flexible tool at least partially over or through the first selectively flexible tool while the second selectively flexible tool is in the slacked position includes positioning a distal end of the second selectively flexible tool proximate a distal end of the first selectively flexible tool.

In certain exemplary aspects positioning the second selectively flexible tool at least partially over or through the first selectively flexible tool while the second selectively flexible tool is in the slacked position includes positioning the second selectively flexible tool at least partially over the first selectively flexible tool.

In certain exemplary aspects the method further includes moving the first selectively flexible tool to slacked position subsequent to moving the second selectively flexible tool to the tensioned position; and removing the first selectively flexible tool from the environment.

For example, in certain exemplary aspects the method further includes positioning a third selectively flexible tool at least partially over or through the second selectively flexible tool while the third selectively flexible tool is in a slacked position; and moving the third selectively flexible tool to a tensioned position.

For example, in certain other exemplary aspects the method further includes moving the second selectively flexible tool to the slacked position subsequent to moving the third selectively flexible tool to the tensioned position; and removing the second selectively flexible tool from the environment.

For example, in certain exemplary aspects the first selectively flexible tool defines a first outer diameter, wherein the third selectively flexible tool defines a third outer diameter, and wherein the third outer diameter is substantially equal to the first outer diameter.

For example, in certain other exemplary aspects the second selectively flexible tool defines a hollow tube defining a second inner diameter, and wherein the second inner diameter is greater than the first outer diameter and the third outer diameter.

For example, in certain other exemplary aspects the first selectively flexible tool defines a first hollow tube defining a first inner diameter, wherein the third selectively flexible tool defines a third hollow tube defining a third inner diameter, and wherein the third inner diameter is substantially equal to the first inner diameter.

For example, in certain other exemplary aspects the second selectively flexible tool defines a second outer diameter, and wherein the second outer diameter is less than the first inner diameter and the third inner diameter.

In certain exemplary aspects the first selectively flexible tool includes a first plurality of sequentially arranged links movable between a slacked position when the first selectively flexible tool as in the slacked position and a tensioned position when the first selectively flexible tool is in the tensioned position.

For example, in certain exemplary aspects the second selectively flexible tool includes a second plurality of sequentially arranged links movable between a slacked position when the second selectively flexible tool is in the slacked position and a tensioned position when the second selectively flexible tool is in the tensioned position.

For example, in certain exemplary aspects the second selectively flexible tool includes a plurality of joint members, a plurality of link members, and a line assembly, wherein each joint member is positioned between adjacent link members and defines a first longitudinal opening, wherein each of the plurality of link members defines a second longitudinal opening, and wherein the line assembly extends through the first longitudinal opening of each joint member of the plurality of joint members and further extends through the second longitudinal opening of each link member of the plurality of link members.

For example, in certain exemplary aspects the environment is an interior of a gas turbine engine.

For example, in certain other exemplary aspects inserting the first selectively flexible tool into the environment while the first selectively flexible tool is in the slacked position includes inserting the first selectively flexible tool into the gas turbine engine through an opening in the gas turbine engine.

For example, in certain other exemplary aspects the opening is a borescope opening. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 19A is a schematic view of a tool assembly in accordance with an exemplary embodiment of the present disclosure in a first position.

FIG. 19B is a schematic view of the exemplary tool assembly of FIG. 19A in a second position.

FIG. 19C is a schematic view of the exemplary tool assembly of FIG. 19A in a third position.

FIG. 19D is a schematic view of the exemplary tool assembly of FIG. 19A in a fourth position.

FIG. 19E is a schematic view of the exemplary tool assembly of FIG. 19A in a fifth position.

FIG. 19F is a schematic view of the exemplary tool assembly of FIG. 19A in a sixth position.

FIG. 19G is a schematic view of the exemplary tool assembly of FIG. 19A in a seventh position.

FIG. 19H is a schematic view of the exemplary tool assembly of FIG. 19A in a eighth position.

FIG. 19I is a schematic view of the exemplary tool assembly of FIG. 19A in a ninth position.

DETAILED DESCRIPTION

Figure 1:
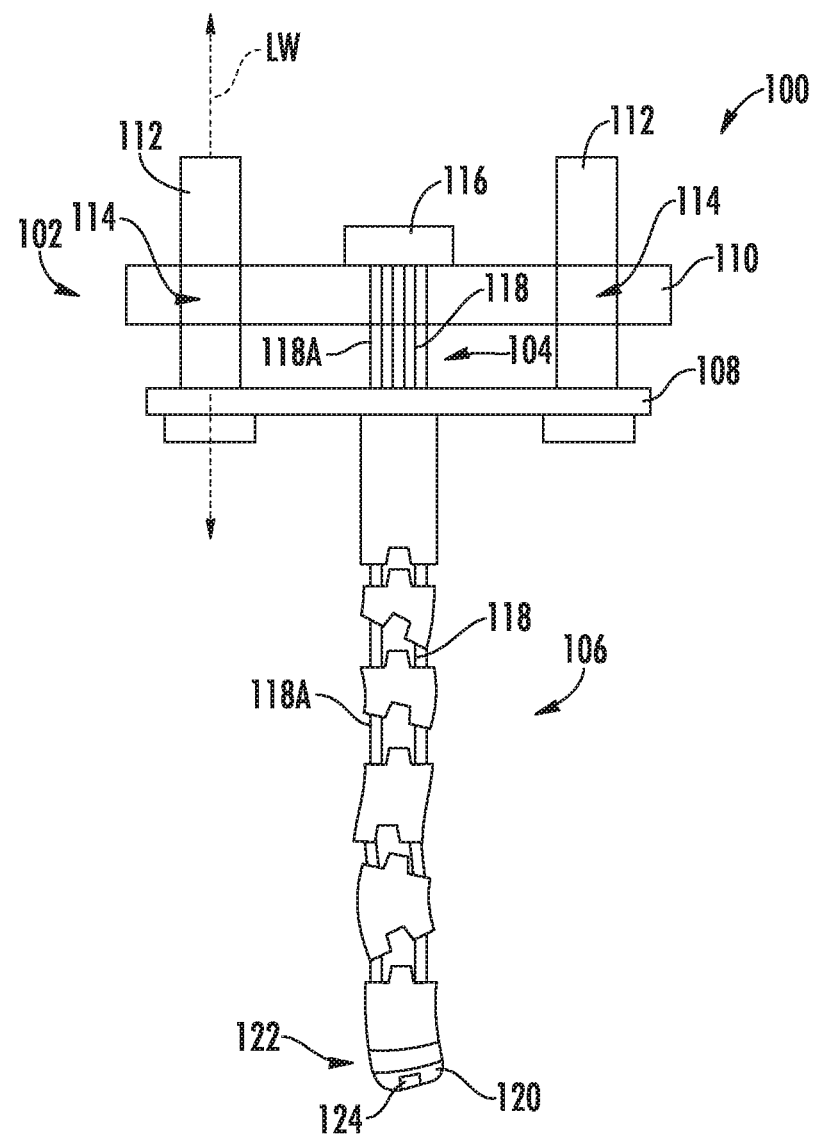
FIG. 1 is a schematic view of an extension tool in accordance with an exemplary embodiment of the present disclosure in a slacked position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of a component or system, and refer to the normal operational attitude of the component or system. For example, with regard to an extension tool in accordance with one or more the present embodiments, forward refers to a position closer to a distal end of the extension tool and aft refers to a position closer to a root end of the extension tool.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
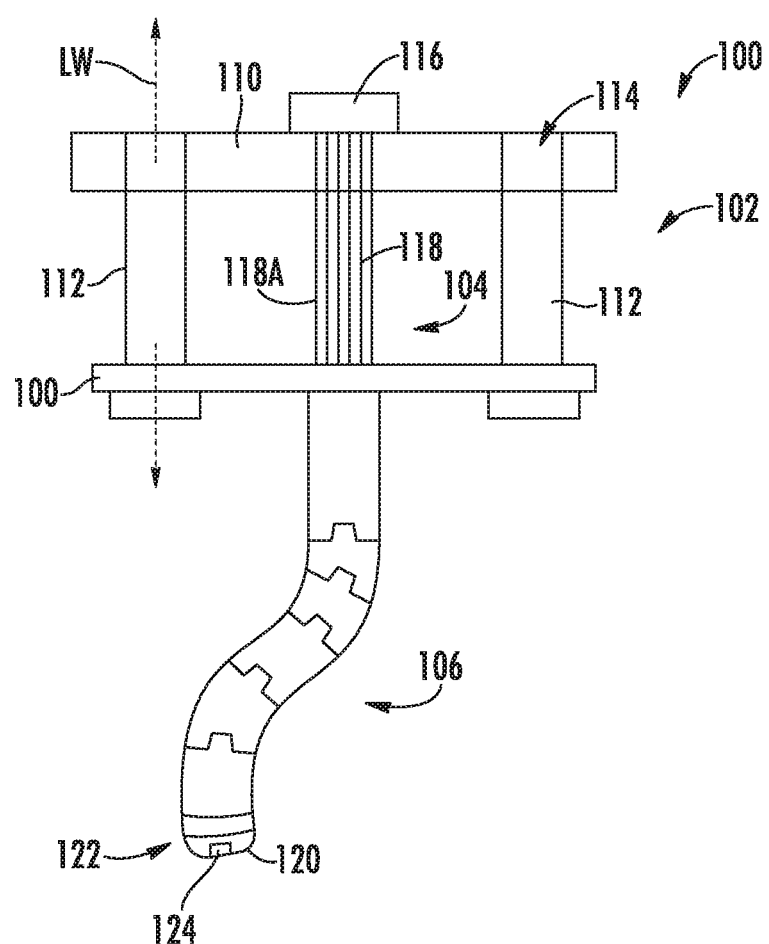
FIG. 2 is a schematic view of the exemplary extension tool of FIG. 1 in a tensioned position.

Referring now to the drawings, wherein identical numerals indicate the same elements throughout the FIGS., FIG. 1 is a schematic view of a selectively flexible extension tool 100 (or simply "extension tool") in accordance with an exemplary embodiment of the present disclosure in a slacked position; and FIG. 2 is a schematic view of the exemplary extension tool 100 of FIG. 1 in a tensioned position.

The extension tool 100 generally includes a base 102, a line assembly 104, and a plurality of sequentially arranged links 106. The base 102 generally includes a first plate 108, a second plate 110, and one or more extension guides 112. For the embodiment depicted, the one or more extension guides 112 includes a pair of extension guides 112 fixedly coupled to the first plate 108 and extending in a lengthwise direction LW. The second plate 110 of the base 102 includes openings 114 corresponding to the pair of extension guides 112, such that the second plate 110 is slidable along the extension guides 112 in the lengthwise direction LW away from the first plate 108 and towards the first plate 108.

The line assembly 104 generally includes a root 116 coupled to the second plate 110 of the base 102 and a plurality of lines 188 extending from the root 116. The plurality of lines 118 includes a first line 118A, and the first line 118A (along with the rest of the lines 118 for the embodiment shown) is operable with the plurality of sequentially arranged links 106 to move the plurality of sequentially arranged links 106 between the slacked position (FIG. 1) and the tensioned position (FIG. 2). As will be explained in greater detail below, the plurality of sequentially arranged links 106 are spaced from one another when in the slacked position to allow the plurality of sequentially arranged links 106 to pivotably move relative to one another. By contrast, the plurality of sequentially arranged links 106 are pressed against one another when in the tensioned position to rigidly fix the plurality of sequentially arranged links 106 to one another.

As noted, for the embodiment shown, each of the plurality of lines 118 is operable with the plurality of sequentially arranged links 106 to move the plurality of sequentially arranged links 106 between the slacked position and the tensioned position. It will be appreciated that each of these lines 118 may be configured as cables, ropes, threads, etc. Accordingly, it will be appreciated that the lines 118 are generally flexible (i.e., will not prevent the plurality of sequentially arranged links 106 from pivotably moving relative to one another in the slacked position).

Briefly, for the embodiment depicted, it will be appreciated that the extension tool 100 depicted in FIGS. 1 and 2 is a tool member including a tool implement 120 coupled to one of the plurality of links 106. More specifically, the extension tool 100 defines a distal end 122, and the tool implement 120 is coupled to the link 106 at the distal end 122. For the embodiment shown, the tool implement 120 includes one or more sensors, cameras, or both, and more specifically includes a sensor 124. The one or more sensors, cameras, or both may be operably coupled to a controller or other device (not shown) through one or more electric lines extending through the plurality of sequentially arranged links 106 (e.g., in a manner similar to lines 118, or alternatively through a tube 126 of the plurality of links 106; see, e.g., FIG. 3), or alternatively, through a wireless communication network.

Figure 3:
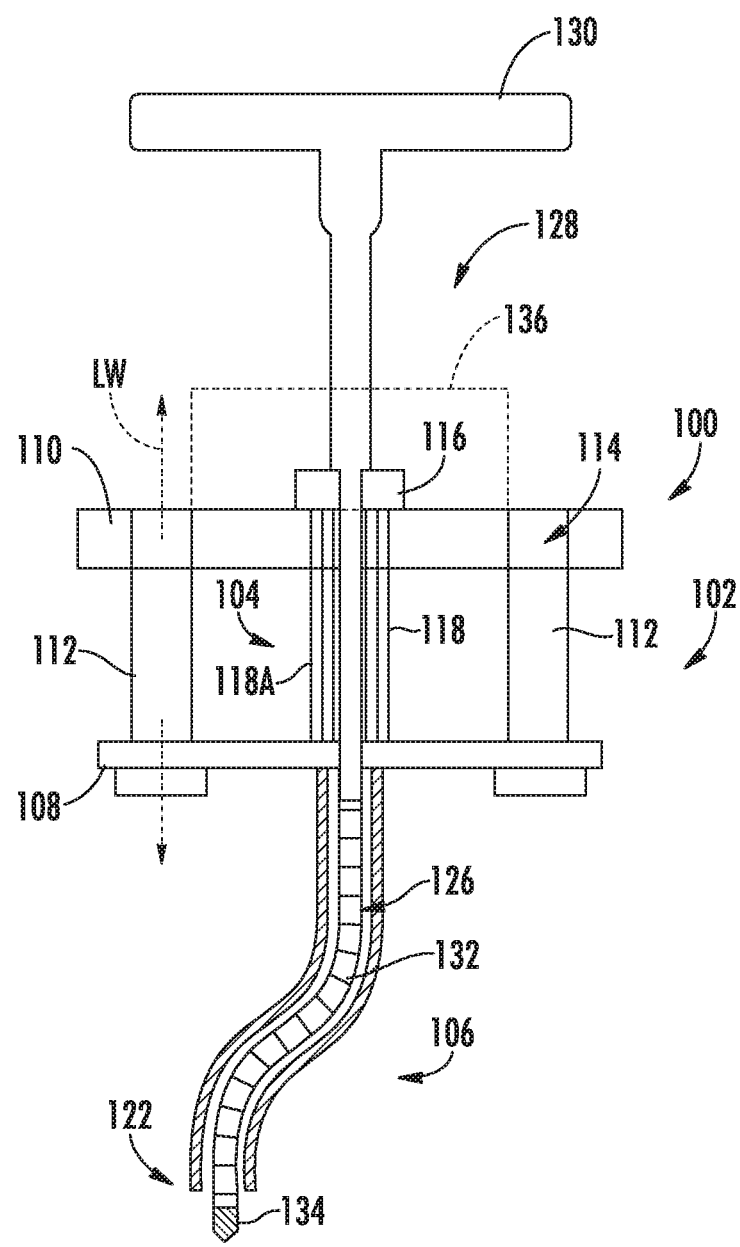
FIG. 3 is a schematic, cross sectional view of an extension tool in accordance with another exemplary embodiment of the present disclosure.

However, in other embodiments, the extension tool 100 may be configured in other suitable manner. For example, referring to FIG. 3, a schematic, partially cross-sectional view of an extension tool 100 in accordance with another exemplary embodiment of the present disclosure is depicted. Specifically, the exemplary extension tool 100 depicted in FIG. 3 is configured as a guide tube. In such a manner, the plurality of sequentially arranged links 106 of the extension tool 100 together define a hollow tube 126 extending therethrough. For the embodiment shown, a separate drill 128 is depicted extending through the hollow tube 126 of the extension tool 100. The drill 128 is, for the embodiment shown, a handheld drill including a handle 130 for rotating the drill 128, a flexible driveshaft 132 extending through the hollow tube 126 defined by the plurality of links 106, and a drill bit 134. Notably, instead of the drill bit being configured as a drill bit for removing material/drilling a hole, in other embodiments, the drill bit 134 may be configured as any other suitable rotatable implement, such as a Phillips head screwdriver bit, a flathead screwdriver bit, a Torx bit, Allen bit, Pozidrive, etc.

In such a manner, the extension tool 100 may facilitate directing the drill bit 134 of the drill 128 at a remote location, or along an obscure vector within an environment (e.g., along a non-linear path within the environment) in a manner that would otherwise not be possible.

It will further be appreciated, however, that in other embodiments, the tool implement 120 may be integrated with the extension tool 100. For example, as is depicted in phantom, the flexible driveshaft of the drill 128 may instead be coupled to a motor 136 attached to the base 102, or rather, attached to the second plate 110 of the base 102. In such a manner, the extension tool 100 may be an integrally formed drill tool having a specific/dedicated function.

Further, in still other embodiments, the extension tool 100 may not be used for, e.g., drilling at a remote location, and instead may be utilized to provide a fluid (e.g., a gas or liquid) to a remote location. For example, the hollow tube 126 may be used to provide a heated gas or liquid to a remote location, may be used to provide lubrication oil to a remote location, etc.

Figure 4:
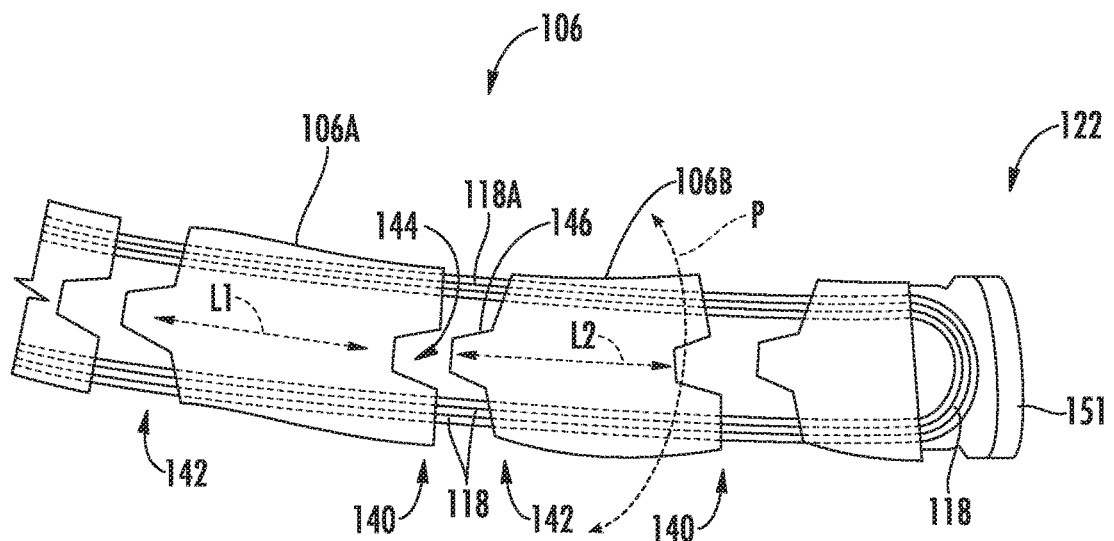
FIG. 4 is a schematic, close-up view of an extension tool in accordance with yet another exemplary embodiment of the present disclosure.

Referring now to FIG. 4, operation of an extension tool 100 in accordance with an exemplary embodiment of the present disclosure will be described in greater detail. FIG. 4 provides a close-up, schematic view of a distal end 122 of an extension tool 100 in accordance with an exemplary embodiment of the present disclosure. The extension tool 100 of FIG. 4 may be configured in substantially the same manner as exemplary extension tool 100 of FIG. 1. Notably, the extension tool 100 of FIG. 4 is depicted in the slacked position.

Briefly, referring to FIG. 4, it will be appreciated that the lines 118 extend down a length of the extension tool 100 and then loop around to extend back the other way along the length of the extension tool 100 at, for the embodiment depicted, the distal end 151. Although not depicted, in at least certain exemplary embodiments, one or more of the lines 118 may include a crimp or other attachment at the distal end 151 (or proximate thereto). The crimp or other attachment may not be under load during normal operation, and instead may be configured to prevent the entire line 118 from pulling out of the plurality of links 106 in the event that the line fails (e.g., breaks or snaps) during operation. In such a case, the crimp or other attachment would be engaged such that the line could be used to pull the plurality of links 106 out of the environment.

Further, as will be appreciated, the plurality of sequentially arranged links 106 of the extension tool 100 includes a first link 106A extending between a forward end 140 and an aft end 142 along a first lengthwise direction L1. The plurality of sequentially arranged links 106 further includes a second link 106B also extending between a forward end 140 and an aft end 142 along a second lengthwise direction L2. The forward end 140 of the first link 106A defines a first interface geometry, and the aft end 142 of the second link 106B defines a second interface geometry complementary to the first interface geometry. It will be appreciated, that as used herein, the term "complementary" with reference to two geometries refers to the two geometries having components configured to fit together to limit movement of the components including the geometries. Briefly, it will also be appreciated that for the embodiment shown, the aft end 142 of the first link 106A defines an interface geometry substantially equal to the second interface geometry, and further, the forward end 140 of the second link 106B defines an interface geometry substantially equal to the first interface geometry. However, in other embodiments, different complementary geometries may be provided between other adjacent links.

Figures 5, 6:
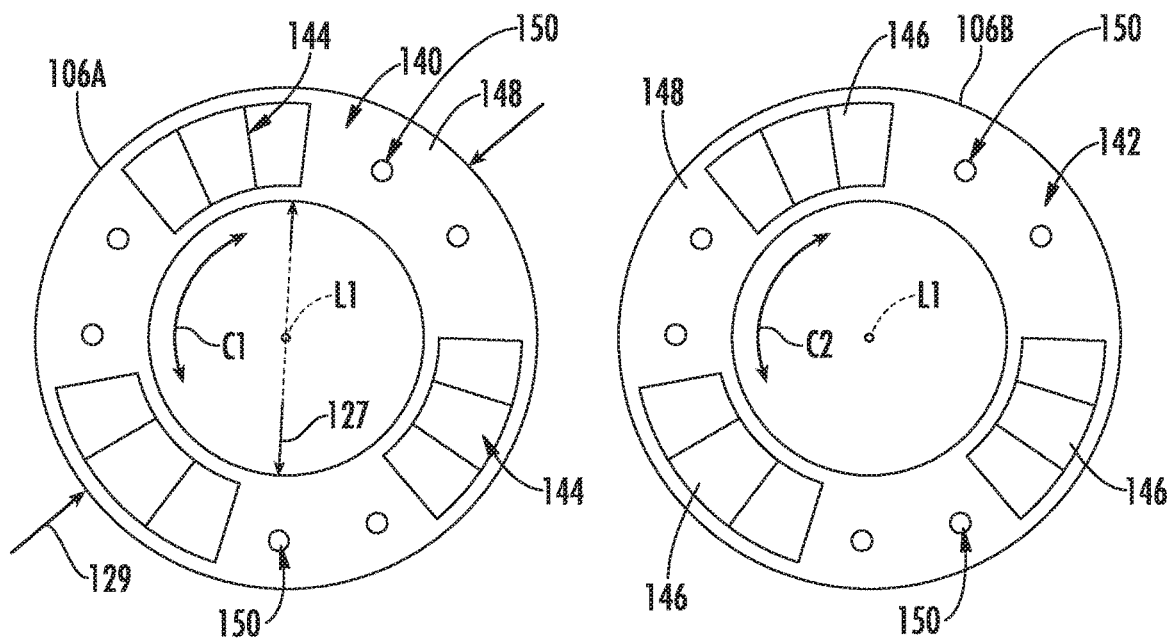
FIG. 5 is an end view of a first link of the exemplary extension tool of FIG. 4.
FIG. 6 is an end view of a second link of the exemplary extension tool of FIG. 4.

More specifically, referring now also to FIGS. 5 and 6, providing plan views of the first interface geometry of the forward end 140 of the first link 106A (FIG. 5) and the second interface geometry of the aft end 142 of the second link 106B (FIG. 6), it will be appreciated that the first interface geometry and second interface geometry together form a kinematic mount between the first link 106A and second link 106B (when in the tensioned position) that restricts relative movement between the first link 106A and second link 106B along at least four degrees of freedom (e.g., opposing circumferential and radial directions; the lines 118 restrict along the longitudinal directions/axial directions, as is explained below). For example, for the embodiment shown the first interface geometry, or rather the first link 106A, defines a first circumferential direction C1 and includes at least two indentions 144 spaced along the first circumferential direction C1. Similarly, the second interface geometry defines a second circumferential direction C2 includes at least two extension members 146 corresponding in shape to the least two indentions 144. More specifically, the at least two indentions 144 of the first interface geometry includes three indentions 144 spaced along the first circumferential direction C1 of the first interface geometry, and the at least two extension members 146 of the second interface geometry includes three corresponding extension members 146 spaced along the second circumferential direction C2 of the second interface geometry. When in the tensioned position, each of the three extension members 146 of the second interface geometry are received within/rest within the three indentions 144 of the first interface geometry to restrict movement of the second link 106B relative to the first link 106A in all degrees of freedom (with the help of the lines 118; see, e.g., FIG. 2).

It will be appreciated, however, that in other embodiments, any other suitable kinematic mounting geometries may be provided between adjacent links 106 to restrict movement of the adjacent links 106 when the links 106 are in the tensioned position. For example, in other embodiments, the first and/or second geometry may include pins, ridges, etc., and the other of the first and/or second geometry may include corresponding openings, valleys, etc.

Referring still to FIGS. 5 and 6, briefly it will be appreciated that each of the plurality of links 106, and accordingly the hollow tube 126 defined thereby, defines an inner diameter 127. The term "inner diameter" may refer to the smallest crosswise measure of the hollow tube 126. The inner diameter 127 may dictate the size of tools or other components that may extend through the hollow tube 126. Briefly, the extension tool 100, or rather the plurality of links 106 further define an outer diameter 129, which may refer to the largest crosswise measure of the plurality of links 106 of the extension tool 100.

Referring particularly to FIG. 4, and as is noted above, the first line 118A, or rather, the plurality of lines 118, of the line assembly 104 is operable with the plurality of links 106 to move the plurality of links 106 between the slacked position (shown) and the tensioned position. Specifically with reference to the first link 106A and the second link 106B, the plurality of lines 118 (including the first line 118A) are slidable relative to at least the first link 106A to move the plurality of sequentially arranged links 106 between the slacked position and the tensioned position. More specifically, still, referring again briefly to FIGS. 5 and 6, each of the plurality of links 106 includes a circumferential wall 148, and the first line 118A of the line assembly 104 extends through the circumferential wall 148 of each of the plurality of links 106. More particularly, as may be clearly seen in FIGS. 5 and 6, for the embodiment shown each link 106 of the plurality of links 106 defines a lengthwise opening 150 in the circumferential wall 148, with the first line 118A of the line assembly 104 slidably received through the lengthwise opening 150 of the circumferential wall 148 of each link 106 of the plurality of links 106. Further for the embodiment shown, each of the plurality of lines 118 of the line assembly 104 are slidably received through corresponding lengthwise openings 150 in the circumferential walls 148 of the plurality of links 106. Notably, however, in other embodiments, one or more of the plurality of lines 118 of the line assembly 104 may instead be slidably coupled to the links 106 in any other suitable manner (e.g., through eyelets on the outer surface of the links 106, inner surfaces of the circumferential walls 148, etc.).

Moreover, for the embodiment shown, the extension tool 100 includes a cap 151 positioned at the distal end 122 and coupled to the link 106 at the distal end 122. The lines 118 are looped through a suitable channel in the cap 151 (i.e., not slidable relative to the cap 151), such that when the lines 118 are tensioned, the links 106 are moved to the tensioned position. (However, in other embodiments, one or more of the lines 118 may be fixed to the cap 151.) As will be appreciated, FIG. 4 depicts the first link 106A and the second link 106B in the slacked position. The second link 106B is spaced from the first link 106A when the plurality of links 106 are in the slacked position to allow the second link 106B to pivotably move relative to the first link 106A (e.g., in a pivot direction P). For example, as is shown, when in the slacked position, the second link 106B is connected to the first link 106A only through the plurality of lines 118 of the line assembly 104. Given that the plurality of lines 118 may be relatively flexible, the second link 106B may pivot relative to the first link 106A. More particularly, the second link 106B may move relative to the first link 106A such that an angle defined between the second lengthwise direction L2 and the first lengthwise direction L1 varies, e.g., at least about thirty degrees, such as at least about sixty degrees, such as at least about ninety degrees, such as up to about three hundred degrees. In such a manner, the extension tool 100 may be maneuvered through, e.g., a serpentine path, or other non-linear path, within an environment when the plurality of links 106 are in the slacked position.

By contrast, referring still to the first link 106A and second link 106B of the plurality of links 106, the second link 106B is pressed against the first link 106A when the plurality of links 106 are in the tensioned position to press the second interface geometry of the aft end 142 of the second link 106B against the first interface geometry of the forward end 140 of the second link 106B and rigidly fix the second link 106B to the first link 106A. In such a manner, it will be appreciated that when the plurality of links 106 are in the tensioned position, the plurality of links 106 form an effectively solid/rigid arm of the extension tool 100.

To illustrate this point further, reference is made back briefly to FIGS. 1 and 2. As will be appreciated from the embodiment shown therein, the plurality of links 106 of the extension tool 100 may be moved from the slacked position (FIG. 1) to the tensioned position (FIG. 2) by tensioning the plurality of lines 118 of the line assembly 104, and more specifically, by moving the second plate 110 of the base 102 along the extension guides 112 of the base 102 away from the first plate 108, pulling the plurality of lines 118 of the line assembly 104 at the root 116. Notably, the lines 118 may be slidably coupled to each of the plurality of links 106, with the exception of the link 106 at the distal end 122 (or rather the cap 151, as noted above). The lines 118 may be fixed to the link 106 and/or cap 151 at the distal end 122, such that when the plurality of lines 118 are tensioned, the links 106 are each pressed together to rigidize the links 106/move the links to the tensioned position.

Referring further to FIGS. 1 and 2, it will be appreciated that by designing the links to have a particular geometry and/or orientation, the plurality of links 106 may form a desired shape when in the tensioned position. In such a manner, as briefly noted above, the plurality of links 106 in the slacked position may be threaded through, e.g., a relatively serpentine or other non-linear path within an environment, and then may be moved to the tensioned position using the plurality of lines 118 of line assembly 104 once inserted to effectively result in a rigid tool within the nonlinear path of the environment. In such a manner, the extension tool 100 may facilitate performing operations or inspections on components within an environment that would otherwise be unreachable, or unreachable without taking apart, dismantling, or damaging the environment.

For the embodiment of FIGS. 1 and 2, as well as FIG. 4, it will be appreciated that each of the plurality of links 106 are specifically designed to result in a specific rigidized shape when the plurality of links 106 are moved to the tensioned position. For example, with reference particularly to FIG. 4, the first link 106A defines a first geometry (i.e., length, curvature, etc.) and the second link 106B defines a second geometry (i.e., link, curvature, etc.). The first geometry is different than the second geometry. In at least certain exemplary embodiments, in order to form the plurality of links 106 having specific geometries to facilitate a desired and shape of the plurality of links 106, each of the plurality of links 106 may be formed through an additive manufacturing process (sometimes also referred to as 3D printing). Such may facilitate the formation of specifically shaped links 106 to be fitted within the plurality of links 106 of an extension tool 100 resulting in a desired shape when moved to the tensioned position, yet still remaining flexible enough to fit through the anticipated environment.

It will be appreciated, however, that in other embodiments, the plurality of links 106 of the extension tool 100 may be formed in any other suitable manner and may have any other suitable shape or configuration. For example, referring now to FIGS. 7 and 8 a plurality of links 106 of an extension tool 100 in accordance with another embodiment of the present disclosure is depicted. The plurality of links 106 of the extension tool 100 of FIGS. 7 and 8 may be configured in a similar manner to the exemplary plurality of links 106 described above with reference to, e.g., FIGS. 4 through 6. For example, the exemplary plurality of links 106 described in FIGS. 7 and 8 includes a first link 106A and a second link 106B (see FIG. 7). The first link 106A defines a first geometry and the second link 106B defines a second geometry. Each link 106 includes a circumferential wall 148 defining an outer rim 149 on an exterior of the circumferential wall 148 at the forward end 140 and an outer rim 151 at the aft end 142. The links 106 are each pressed together such that the outer rim 149 at the forward end 140 of each link 106 are aligned and in direct contact with the outer rim 151 at the aft end 142 of an adjacent link 106. However, for the embodiment of FIGS. 7 and 8, the first geometry and the second geometry are substantially the same.

Figure 7:
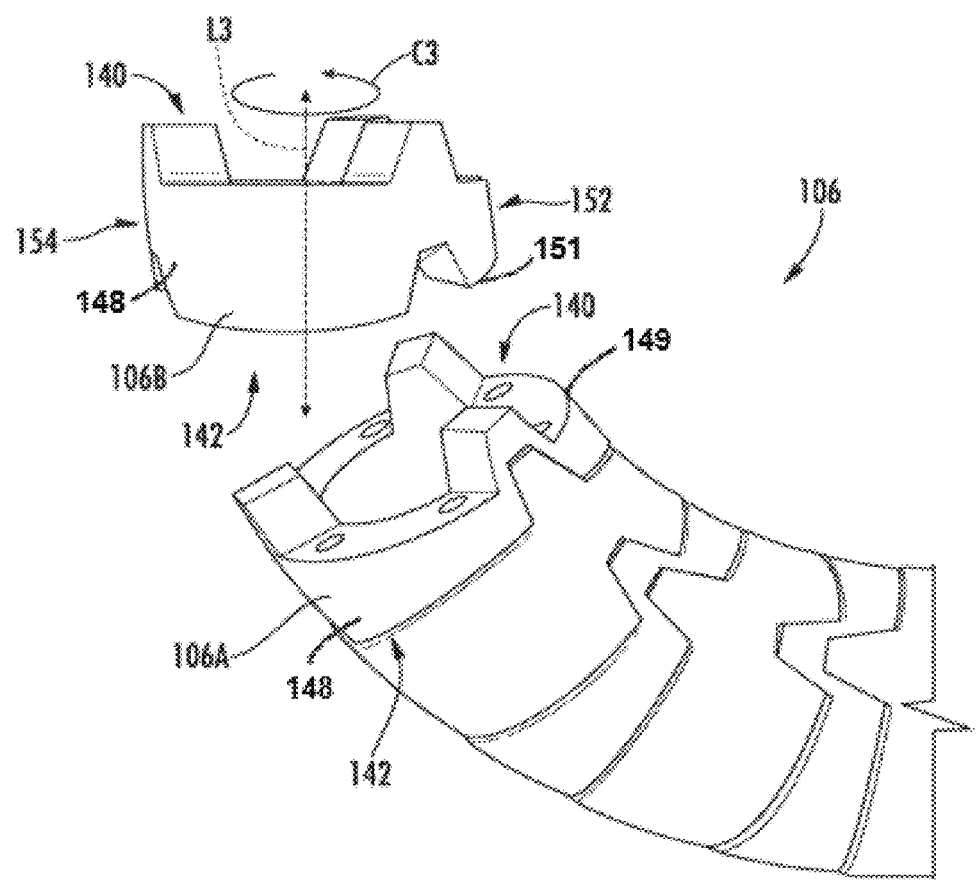
FIG. 7 is a close-up view of a plurality of links of an extension tool in accordance with an exemplary embodiment of the present disclosure.
Figure 8:
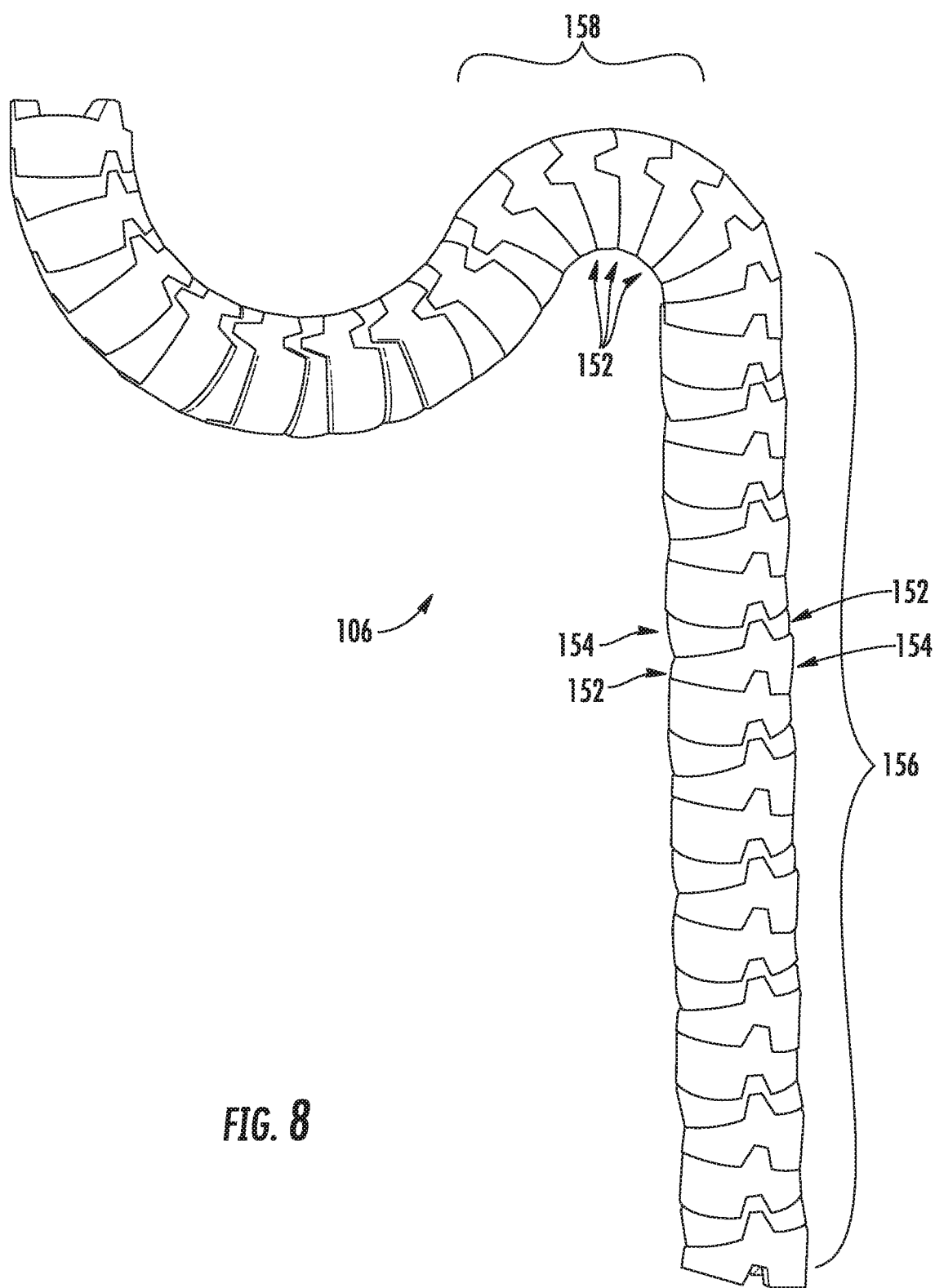
FIG. 8 is another view of the exemplary plurality of links of FIG. 7.

More specifically, each link of the plurality of links 106 of FIGS. 7 and 8 generally defines a longitudinal direction L3 and a circumferential direction C3 (see FIG. 7). Each link 106 generally includes a short side 152 at a first circumferential position along the circumferential direction C3 and a long side 154 at a second circumferential position along the circumferential direction C3 (the short side 152 defining a length along the longitudinal direction L3 less than a length of the long side 154 along the longitudinal direction L3). Further, each link 106 of the plurality of links 106 includes a uniform first interface geometry at a forward end 140 along the longitudinal direction and a uniform second interface geometry at an aft end 142 along the longitudinal direction. The first interface geometry includes three extension members 146 spaced evenly along the circumferential direction C3, and the second interface geometry includes three correspondingly shaped indentions 144 also spaced evenly along the circumferential direction C3 (i.e., for receiving the three extension members 146 of an adjacent link 106).

In such a manner, the plurality of uniform links 106 may be arranged to define just about any desired shape when the plurality of links 106 are moved to the tensioned position. For example, referring particularly FIG. 8, it will be appreciated that by pairing the short side 152 of one link 106 with the long side 154 of an adjacent link 106 sequentially may allow for forming a substantially linear portion (e.g., straight portion 156), pairing the short side 152 of one link 106 with the short side 152 of an adjacent link 106 sequentially may allow for forming a relatively tight bend (e.g., bend 158), etc. In such a manner, by changing a relative orientation (e.g., circumferentially) of adjacent links 106, the plurality of links 106 may define any desired three-dimensional shape when tensioned. Further, it will be appreciated that by utilizing uniform geometry links 106, the uniform geometry links 106 may be stored in bulk on-site, and a specialized extension tool 100 defining a unique three-dimensional shape and length may be formed relatively quickly by arranging sequential links 106 in a particular manner/circumferential orientation.

As discussed above, when the plurality of links 106 are in the slacked position, adjacent links 106 may be able to pivot relative to one another to allow the plurality of links 106 to maneuver through nonlinear paths through an environment. When gravity is assisting with maintaining the plurality of links 106 separate from one another, it may be relatively easy to maneuver the plurality of links 106 through the nonlinear path. However, in certain embodiments, other features may be provided for maintaining the plurality of links 106 separate from one another to facilitate the maneuverability of the plurality of links 106 through a nonlinear path.

More specifically, referring generally to FIGS. 9 through 12 various embodiments of an extension tool 100 including features for maintaining the plurality of links 106 separate from one another when in the slacked position are provided. Each of the embodiments depicted in FIGS. 9 through 12, and described below may be configured in substantially the same manner as one or more of the exemplary extension tools 100 described above with reference to, e.g., FIGS. 1 through 8. For example, each of the exemplary extension tools 100 of FIGS. 9 through 12 generally includes a plurality of links 106 (including a first link 106A and a second link 106B) and a line assembly 104 (including a plurality of lines 118 and particularly a first line 118A). However, for the embodiments of FIGS. 9 through 12, the extension tool 100 further includes a biasing member 160 operable with the first link 106A and the second link 106B for biasing the second link 106B away from the first link 106A. However, the plurality of lines 118 of the line assembly 104, including the first line 118A of the line assembly 104, is configured to overcome the biasing member 160 when the plurality of links 106 are moved to the tensioned position.

Figure 9:
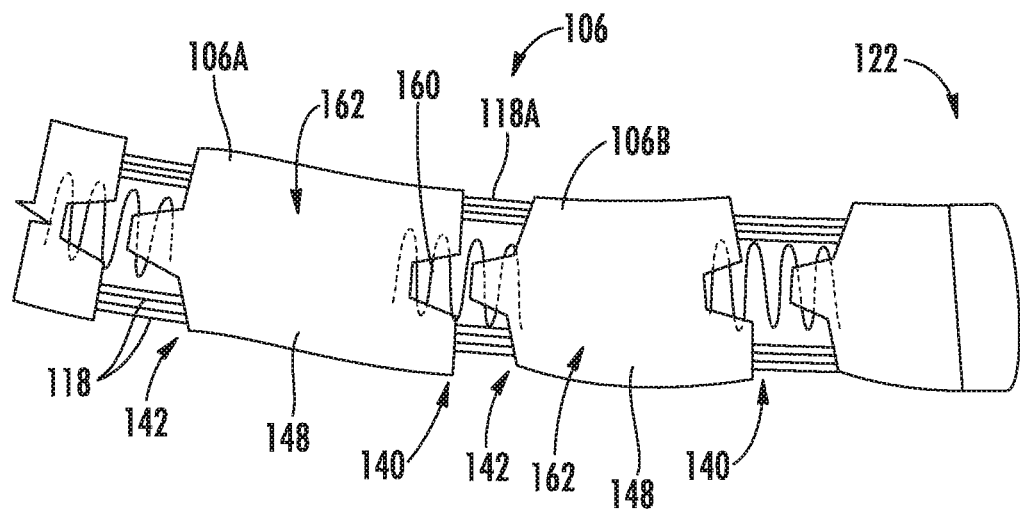
FIG. 9 is a schematic, close-up view of an extension tool in accordance with yet another exemplary embodiment of the present disclosure.

Referring particularly to FIG. 9, it will be appreciated that biasing member 160 is a spring attached to the first link 106A and attached to the second link 106B for pressing the second link 106B away from the first link 106A. For the embodiment shown, it will be appreciated that each of the plurality of links 106 includes a circumferential wall 148 that defines an outer surface 162 and the biasing member 160/spring is positioned inward of the outer surface 162 of the circumferential wall 148 of the first link 106A and inward of the outer surface 162 of the circumferential wall 148 of the second link 106B. More specifically, for the embodiment shown, the biasing member 160/spring is positioned inward of the circumferential wall 148 of the first link 106A and inward of the circumferential wall 148 of the second link 106B. For example, the biasing member 160/spring may be coupled to, or otherwise attached to an inner surface (not shown) of the circumferential walls 148 of the first link 106A and the second link 106B.

Moreover, for the embodiment of FIG. 9, it will be appreciated that the extension tool 100 further includes a plurality of biasing members 160, with each biasing member 160 operable with a pair of adjacent links 160 of the plurality of links 106 for biasing the adjacent links 160 away from one another. Notably, when the plurality of links 106 define a hollow tube 126 extending therethrough (e.g., when the extension tool 100 is configured as a guide tube; see FIG. 3), the springs may be configured such that the openings/center of the springs are aligned with the hollow tube 126 extending through the plurality of links 106 (and not blocking the hollow tube 126).

Figure 10:
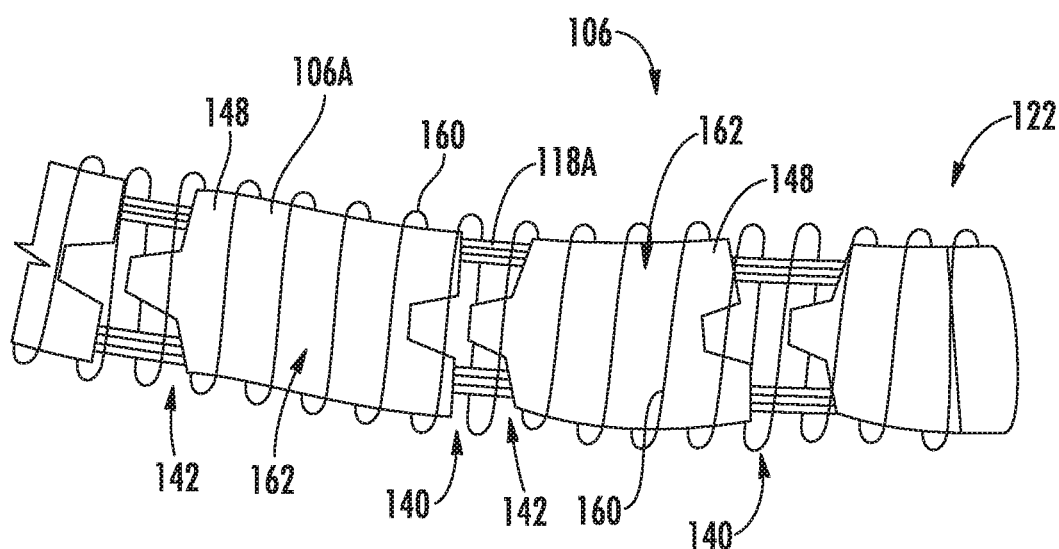
FIG. 10 is a schematic, close-up view of an extension tool in accordance with still another exemplary embodiment of the present disclosure.

Referring now to FIG. 10, it will be appreciated that the exemplary biasing member 160 of the extension tool 100 is operable with each of the plurality of links 106 for biasing adjacent links 106 away from one another. More specifically, for the embodiment depicted, each of the plurality of links 106 defines an outer surface 162 (or rather includes a circumferential wall 148 defining an outer surface 162) and the biasing member 160 is operable with the outer surface 162 of each of the plurality of links 106. More specifically, still, for the embodiment depicted in FIG. 10, the biasing member 160 is a continuous spring attached to the outer surface 162 of the first link 106A and the outer surface 162 of the second link 106B, as well as the outer surfaces 162 of the other links 106 of the plurality of links 106, for biasing the second link 106B away from the first link 106A, as well as the other links 106 away from adjacent links 106. In such a manner, it will be appreciated that the spring defines a substantially constant pitch where it is attached to the outer surfaces 162 of the links 106, and defines a variable pitch between adjacent links 106, based on e.g., a position of the plurality of links 106 in the slacked position or tensioned position, an angle defined between adjacent links 106, etc.

Figure 11:
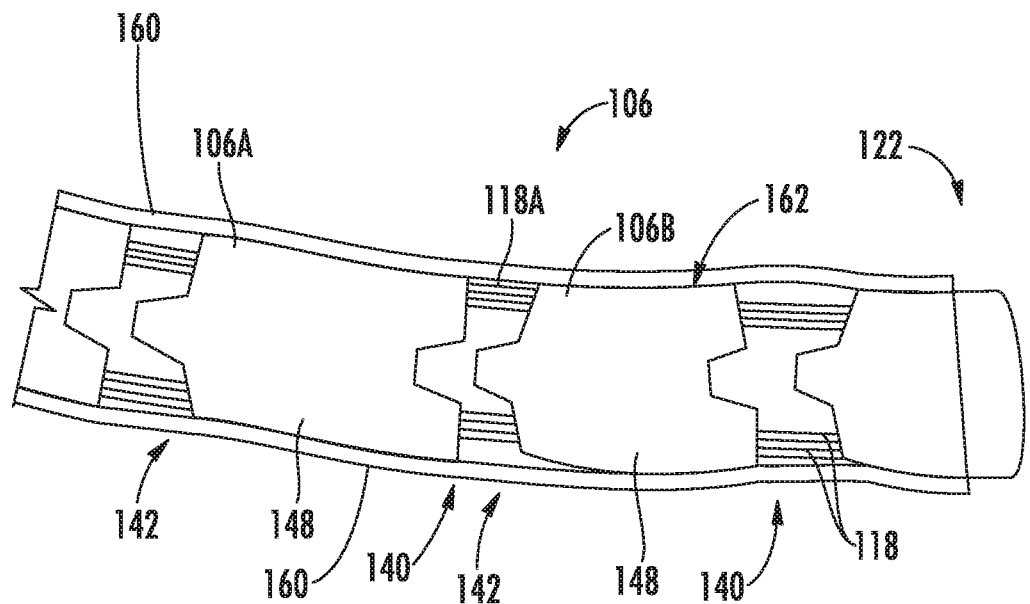
FIG. 11 is a schematic, close-up view of an extension tool in accordance with yet another exemplary embodiment of the present disclosure.

Referring now to FIG. 11, however, in other embodiments, any other suitable biasing member 160 may be provided operable with each of the plurality of links 106 and coupled to the outer surface 162 of each of the plurality of links 106. For example, for the embodiment of FIG. 11, the biasing member 160 comprises an elastomeric material attached the outer surface 162 of each of the plurality of links 106 and extending substantially continuously along each of the plurality of links 106. For example, in certain embodiments, the elastomeric material may be an elastomeric sleeve extending around each of the plurality of links 106 and coupled to the outer surface 162 of each of the plurality of links 106. However, in other embodiments, the elastomeric material may be discrete strips extending along the plurality of links 106 coupled to the outer surface 162 of each of the plurality of links 106, may be a plurality of elastomeric sections extending between adjacent pairs of links 106, etc.

Figure 12:
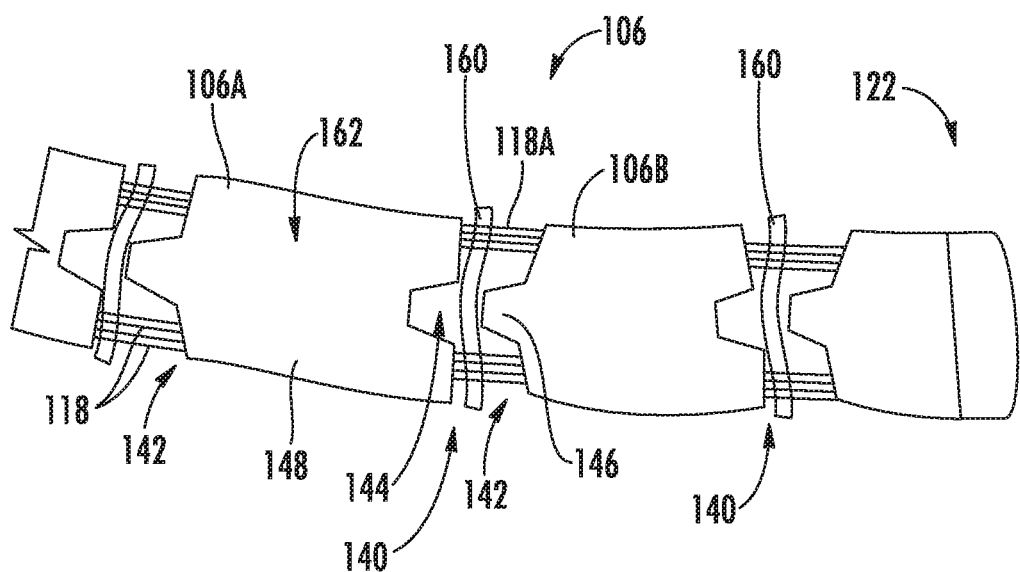
FIG. 12 is a schematic, close-up view of an extension tool in accordance with still another exemplary embodiment of the present disclosure.

Referring now to FIG. 12, the exemplary extension tool 100 depicted again includes a plurality of individual biasing members 160. Each of the individual biasing members 160 is configured as an elastomeric material positioned between adjacent links 106 of the plurality of links 106. For example, one of the plurality biasing members 160 is configured as an elastic member positioned at least partially between the first link 106A and the second link 106B. For example, each of the biasing members 160 may be configured as discs configured to urge adjacent links 106 away from one another, and more specifically, configured to urge indentions 144 of one link 106 away from corresponding extension members 146 in an adjacent link 106.

It will be appreciated however, that the embodiments of FIGS. 9 through 12 are provided by way of example only. In other embodiments, any other suitable biasing member 160 may be provided for urging a first link 106A away from a second, adjacent link 106B, or for urging any of the adjacent links 106 away from one another, when in the slacked position, to assist with the insertion and/or removal of the plurality of links 106 of the extension tool 100 to and/or from, e.g., a nonlinear path within the environment.

Further, in other embodiments, still other configurations may be provided. For example, reference will now be made to FIG. 13, providing a schematic, cross-sectional view of an extension tool 100 in accordance with another exemplary embodiment of the present disclosure. The exemplary extension tool 100 of FIG. 13 may be configured in a similar manner to the exemplary extension tools 100 described above with reference to FIGS. 1 through 12.

Figure 13:
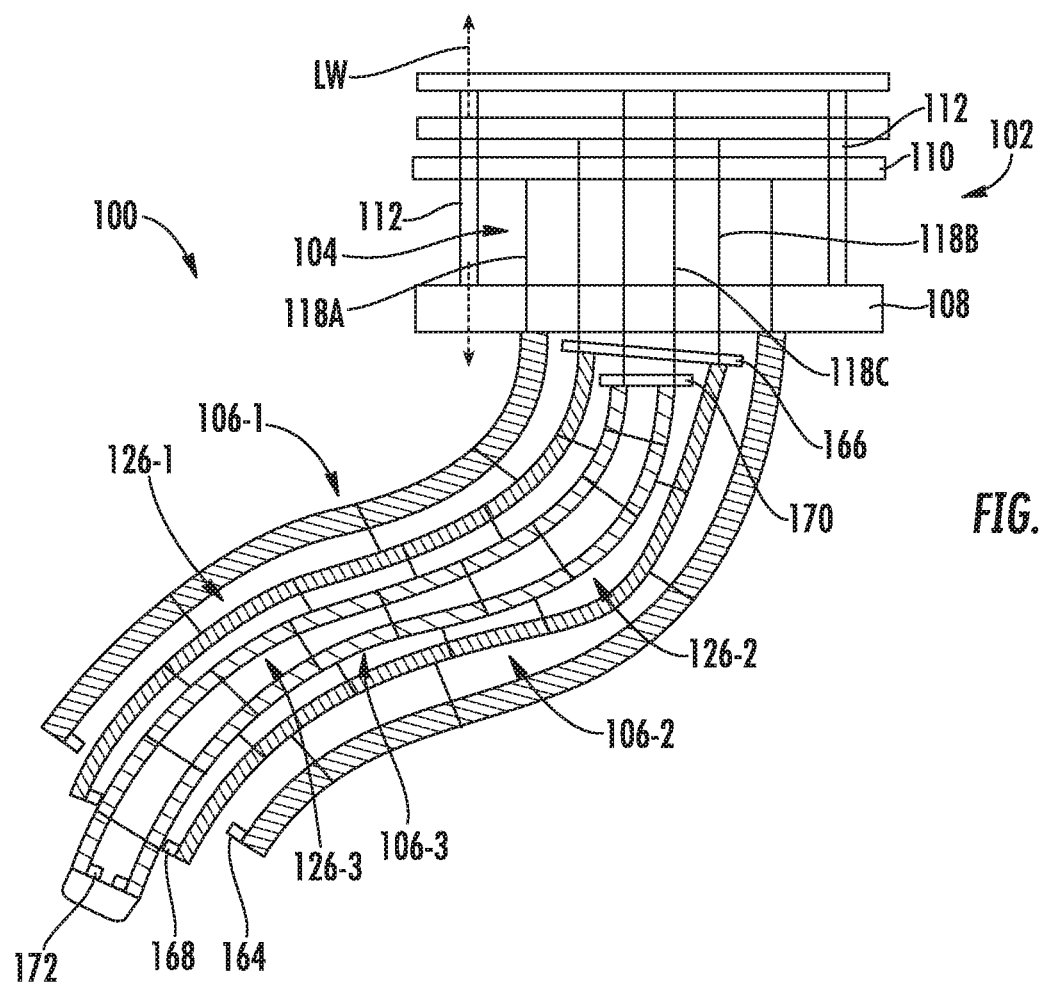
FIG. 13 is a schematic, cross-sectional view of an extension tool in accordance with the present disclosure including multiple pluralities of links, arranged in a retracted position.

For example, the exemplary extension tool 100 of FIG. 13 generally includes a base 102, a line assembly 104, and a plurality of sequentially arranged links 106. The line assembly 104 includes a first line 118A operable with the plurality of sequentially arranged links 106 to move the plurality of sequentially arranged links 106 between a slacked position and a tensioned position (shown). As will be appreciated from the description above, the plurality of sequentially arranged links 106 are spaced from one another when in the slacked position to allow the plurality of sequentially arranged links 106 to pivotably move relative to one another. However, the plurality of sequentially arranged links 106 are pressed against one another in the tensioned position to rigidly fix the plurality of sequentially arranged links 106 to one another as is depicted.

More specifically, however, for the embodiment of FIG. 13 the plurality of sequentially arranged links 106 is configured as a first plurality of sequentially arranged links 106-1 defining a first guide tube 126-1 extending therethrough. The extension tool 100 further includes a second plurality of sequentially arranged links 106-2 movably positioned at least partially within the first guide tube 126-1 of the first plurality of sequentially arranged links 106-1. The second plurality of sequentially arranged links 106-2 similarly defines a second guide tube 126-2 extending therethrough. Further, still, for the embodiment shown the extension tool 100 includes a third plurality of sequentially arranged links 106-3 movably positioned at least partially within the second guide tube 126-2 of the second plurality of sequentially arranged links 106-2.

In order to operate the second plurality of links 106-2 and third plurality of links 106-3, the line assembly 104 further includes a second line 118B and a third line 118C. The second line 118B is operable with the second plurality of links 106-2 to move the second plurality of links 106-2 between a slacked position (e.g., similar to the slacked position of the sequentially arranged links 106 of FIG. 1) and a tensioned position (shown). Similarly, the third line 118C is operable with the third plurality of links 106-3 to move the third plurality of links 106-3 between a slacked position (e.g., similar to the slacked position of the sequentially arranged links 106 of FIG. 1) and a tensioned position (shown).

The second plurality of links 106-2 and third plurality of links 106-3 are depicted in FIG. 13 in a retracted, nested configuration. When the first plurality of links 106-1, second plurality of links 106-2, and third plurality of links 106-3 are nested within one another and each in the slacked position, they may move in unison through a first section of a nonlinear path through an environment. The first plurality of links 106-1 may then be independently moved to a tensioned position using the first line 118A (or plurality of first lines 118A). The second plurality of links 106-2 and third plurality of links 106-3 may subsequently be extended from the first guide tube 126-1 through a second portion of a nonlinear path through an environment. The second plurality of links 106-2 may then be independently be moved to a tensioned position using the second line 118B (or plurality of second lines 118B). Finally, the third plurality of links 106-3 may be extended from the second guide tube 126-2 through a third portion of a non-linear path of an environment. The third plurality of links 106-3 may then independently be moved to a tensioned position using the third line 118C (or a plurality of third lines 118C).

Figure 14:
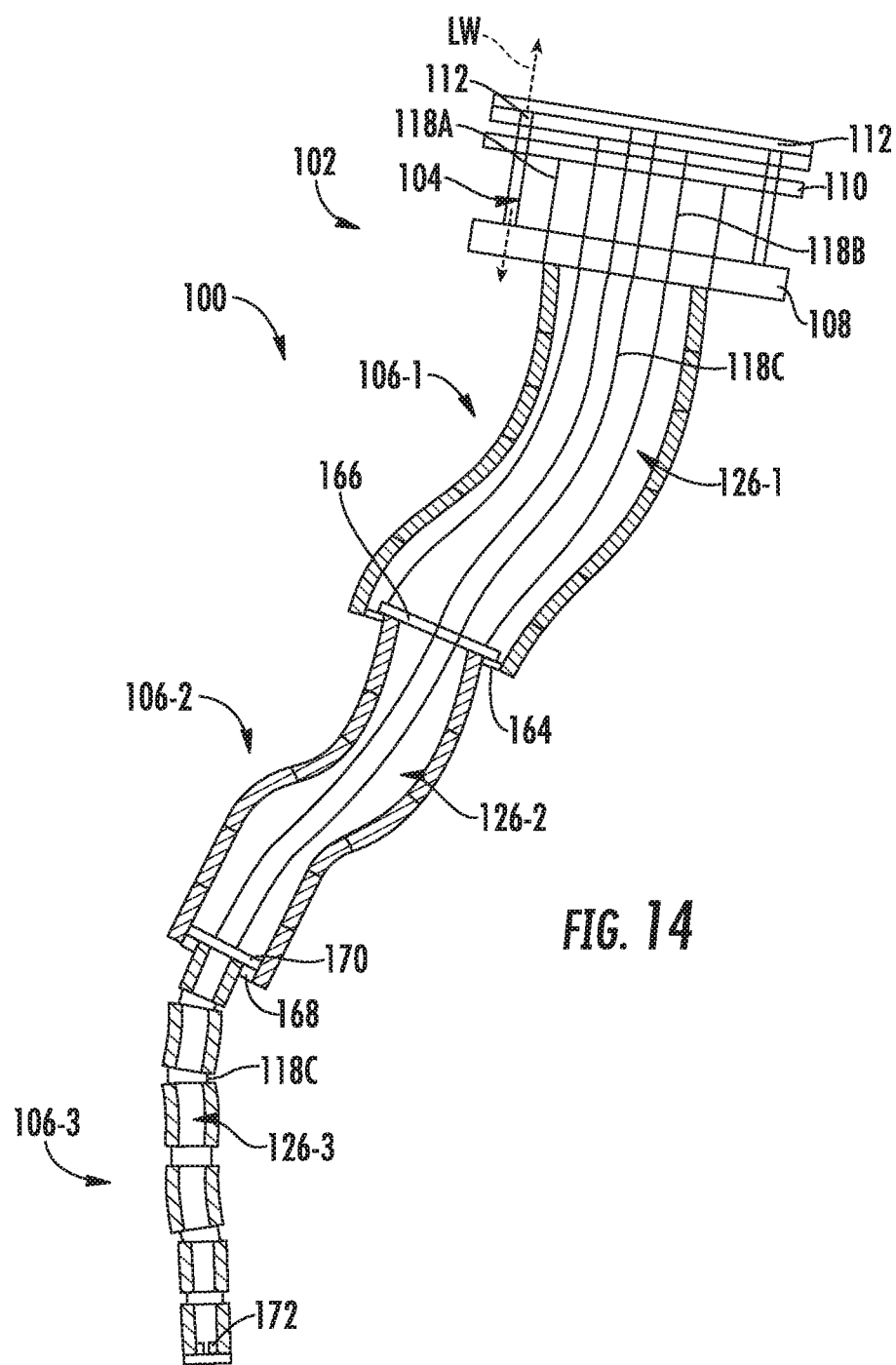
FIG. 14 is a schematic, cross-sectional view of the extension tool of FIG. 13 with the multiple pluralities of links arranged in an extended position.

For example, referring to FIG. 14, the exemplary extension tool 100 of FIG. 13 is depicted with the second plurality of sequentially arranged links 106-2 extended from the first guide tube 126-1 of the first plurality of sequentially arranged links 106-1, and further with the third plurality of sequentially arranged links 106-3 extended from the second guide tube 126-2. As is depicted in FIG. 14, the first plurality of links 106-1 has been moved to the tensioned position, and similarly, the second plurality of links 106-2 is also been moved to the tensioned position. By contrast, the third plurality of links 106-3 is in the slacked position. In such a manner, the third plurality of links may be maneuvered through a nonlinear path within an environment before also being moved to the tensioned position. As will be appreciated, such a configuration may allow for the extension tool 100 to position the second plurality of links 106-2 adjacent to, e.g., a nonlinear path within an environment that would otherwise be difficult to reach, or unreachable using a singular plurality of links 106. Similarly, such a configuration may allow for the extension tool to position the third plurality of links 106-3 adjacent to, e.g., another nonlinear path within the environment that would otherwise be difficult to reach, or unreachable using two pluralities of links.

Referring to FIGS. 13 and 14, it will be appreciated that the first plurality of links 106-1 includes a stopper 164 at a distal end extending into the first guide tube 126-1, and the second plurality of links 106-2 includes a flange 166 at a forward end configured to catch the stopper 164 at the distal end of the first plurality of links 106-1 and prevent the second plurality of links 106-2 from being removed completely from the first guide tube 126-1. Similarly, the second plurality of links 106-2 includes a stopper 168 at a distal end extending into the second guide tube 126-2, and the third plurality of links 106-3 includes a flange 170 at a forward end configured to catch the stopper 168 at the distal end of the second plurality of links 106-2 to prevent the third plurality of links 106-3 from being removed completely from the second guide tube 126-2. In certain embodiments, the first, second, and third pluralities of sequentially arranged links 106 may be extended by a work implement extended through a third guide tube 126-3 extending through the third plurality of links 106-3 that catches a stopper 172 positioned at a distal end of the third plurality of links 106-3 extending into the third guide tube 126-3. However, in other embodiments, any other suitable apparatus may be utilized to selectively extend the second plurality of links 106-2 from the first plurality of links 106-1, and further to selectively extend the third plurality of links 106-3 from the second plurality of links 106-2.

Moreover, it will be appreciated that the exemplary extension tool 100 depicted in FIGS. 13 and 14 is provided by way of example only. In other embodiments, any other suitable extension tool 100 having pluralities of sequentially arranged links 106 may be provided. For example, although three pluralities of sequentially arranged links 106 are provided in FIGS. 13 and 14, in other embodiments, the extension tool may have any other suitable number of pluralities links 106, such as two, four, six, etc. and each of such pluralities of links 106 may define any desired shape.

Further, although for the embodiment of FIGS. 13 and 14, each of the pluralities of sequentially arranged links 106 are nested within one another (at least when in the retracted position), in other embodiments, any other suitable arrangement of pluralities sequentially arranged links 106 may be provided.

For example, in other embodiments the extension tool 100 may again include multiple pluralities of sequentially arranged links 106, but in other suitable configurations. For example, referring now to FIG. 15, an extension tool 100 in accordance with another exemplary embodiment of the present disclosure is provided. The exemplary extension tool 100 of FIG. 15 may be configured in a similar manner as the exemplary extension tool 100 of FIG. 13. Accordingly, the exemplary extension tool 100 of FIG. 15 may generally include a first plurality of links 106-1, a second plurality of links 106-2, and a third plurality of links 106-3.

Notably, for the embodiment depicted, the first plurality of links 106-1 includes a forward end 174, the second plurality of links 106-2 includes a forward end 176 and an aft end 178, and the third plurality of links 106-3 also includes a forward end 180 and an aft end 182. For the embodiment depicted, the second plurality of links 106-2 is coupled to the forward end 174 of the first plurality of links 106-1, and further, the third plurality of links 106-3 is coupled to the forward end 176 of the second plurality of links 106-2. In such a manner, the first plurality of links 106-1, second plurality of links 106-2, and third plurality of links 106-3 are each arranged in series.

Figure 15:
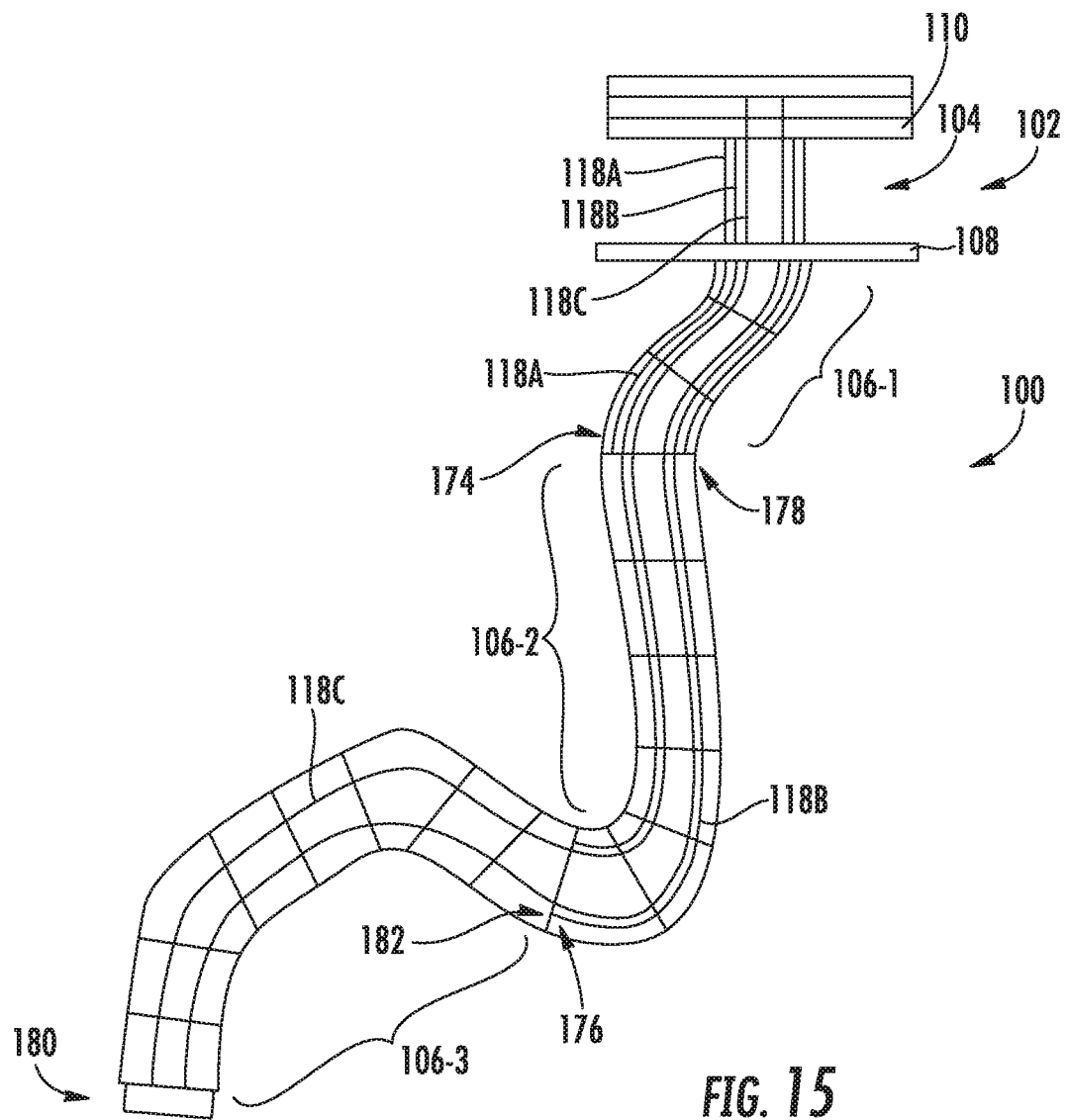
FIG. 15 is a schematic, cross-sectional view of an extension tool in accordance with another embodiment of the present disclosure including multiply pluralities of links.

Similar to the embodiment of FIGS. 13 and 14, for the embodiment of FIG. 15, the line assembly 104 further includes a second line 118B and a third line 118C. The second line 118B is operable with the second plurality of links 106-2 to move the second plurality of links 106-2 between a slacked position and a tensioned position. Similarly, the third line 118C is operable with the third plurality of links 106-3 to move the third plurality of links 106-3 between a slacked position and a tensioned position. Notably, the second line 118B is operable with the second plurality of links 106-2 independent of the first line 118A being operable with the first plurality of links 106-1, and further, the third line 118C is operable with the third plurality of links 106-3 independent of the first line 118A and second line 118B being operable with the first plurality of links 106-1 and second plurality of links 106-2, respectively.

Inclusion of multiple pluralities of sequentially arranged links 106 may allow for insertion of the extension tool 100 into more complex nonlinear paths within the environment.

Figure 16:
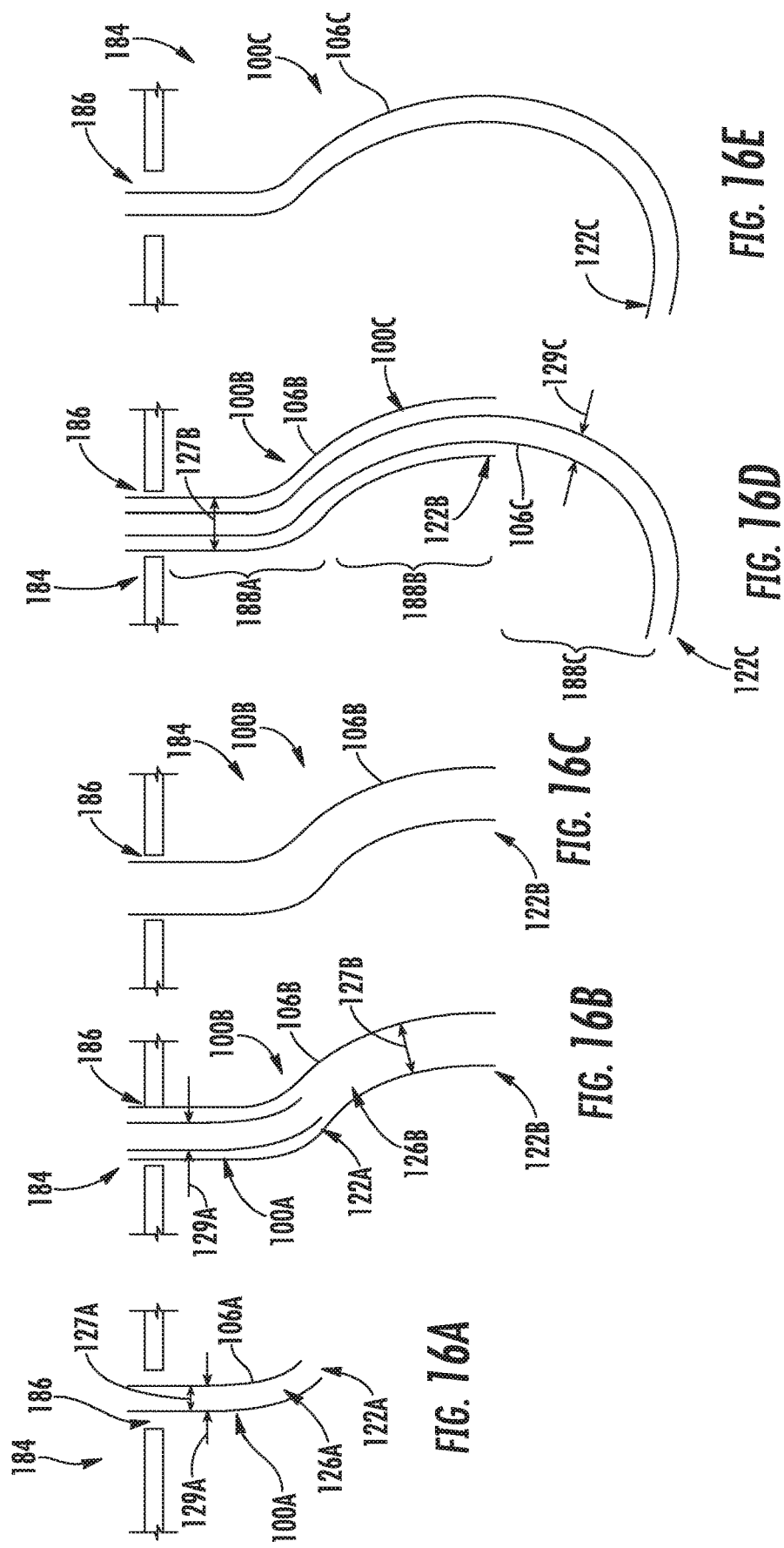
FIG. 16A is a schematic view of a tool assembly in accordance with an exemplary embodiment of the present disclosure in a first position.
FIG. 16B is a schematic view of the exemplary tool assembly of FIG. 16A in a second position.
FIG. 16C is a schematic view of the exemplary tool assembly of FIG. 16A in a third position.
FIG. 16D is a schematic view of the exemplary tool assembly of FIG. 16A in a fourth position.
FIG. 16E is a schematic view of the exemplary tool assembly of FIG. 16A in a fifth position.

Further, referring now to FIG. 16, or rather, FIGS. 16A through 16E, a tool assembly 184 in accordance with an exemplary embodiment of the present disclosure is provided. The tool assembly 184 depicted in FIG. 16 may incorporate or otherwise utilize various aspects of one or more the exemplary embodiments described above with reference to FIGS. 1 through 15.

For example, referring first to FIG. 16A, the exemplary tool assembly 184 includes a first selectively flexible extension tool 100A (or simply "extension tool"). Although not depicted individually (i.e., depicted in a simplified schematic manner), it will be appreciated that the first extension tool 100A may include a first plurality of sequentially arranged links 106A movable between a slacked position and a tensioned position (shown). In such a manner, the first extension tool 100A of FIG. 16A may be configured in accordance with, e.g., the embodiment of FIGS. 1 and 2, the embodiment of FIG. 3, the embodiment of FIGS. 4 through 6, the embodiment of FIGS. 7 and 8, or in accordance with any other suitable embodiment.

Referring still to FIG. 16A, the first extension tool 100A, or rather, the first plurality of sequentially arranged links 106A of the first extension tool 100A, defines a first hollow tube 126A extending therethrough. The first hollow tube 126A defines a first inner diameter 127A, which may refer to a minimum crosswise measure of the first hollow tube 126A. Further, the first extension tool 100A defines a first outer diameter 129A, which may refer to a maximum crosswise measure of the first plurality of links 106A of the first extension tool 100A.

In such a manner, it will be appreciated from the view in FIG. 16A that the first extension tool 100A may be inserted through an opening 186 into an environment in a slacked position, and subsequently moved to a tensioned position. In the tensioned position, the first extension tool 100A may define a predefined shape such that a first distal end 122A of the first extension tool 100A is positioned at a desired location and orientation.

Moreover, referring now also to FIG. 16B, it will be appreciated that the tool assembly 184 further includes a second extension tool 100B. Although also depicted in a simplified schematic manner, it will be appreciated that the second extension tool 100B may include a second plurality of sequentially arranged links 106B movable between a slacked position and a tensioned position (shown). As will be appreciated from the FIGS. and the discussion herein, the second plurality of sequentially arranged links 106B are movable over or through the first plurality of sequentially arranged links 106A, and more specifically, for the embodiment shown the second plurality of sequentially arranged links 106B of the second extension tool 100B are movable over the first plurality of sequentially arranged links 106A of the first extension tool 100A.

More specifically, the second plurality of sequentially arranged links 106B defines a second hollow tube 126B extending therethrough when the second plurality of sequentially arranged links 106B are in the tensioned position. The second hollow tube 126B defines a second inner diameter 127B. The first outer diameter 129A of the first plurality of sequentially arranged links 106A is less than the second inner diameter 127B of the second plurality of sequentially arranged links 106B to allow for the second plurality of sequentially arranged links 106B to be provided over the first plurality of sequentially arranged links 106A.

Accordingly, for example, the second plurality of sequentially arranged links 106B, while in the slacked positioned, may be movable over the first plurality of sequentially arranged links 106A while the first plurality of sequentially arranged links 106A are in the tensioned position. The second plurality of sequentially arranged links 106B may then be moved to the tensioned position. In such a manner, the predetermined shape of the first plurality of sequentially arranged links 106A may ensure the second plurality of sequentially arranged links 106B make it through, e.g., a first section 188A of a nonlinear path through the environment prior to being inserted through a second section 188B of the nonlinear path through the environment (see FIG. 16D).

Notably, the second plurality of sequentially arranged links 106B, when in the tensioned position, define a second overall length (i.e., centerline length) that is greater than a first overall length (i.e., centerline length) of the first plurality of sequentially arranged links 106A, when in the tensioned position. For example, for the embodiment shown, the second overall length is at least about 25 percent greater than the first overall length, such as at least about 50 percent greater than the first overall length, such as up to about 1000 percent greater than the first overall length. In such a manner, the second plurality of sequentially arranged links 106B may reach further into the environment, or rather, further along a nonlinear path through the environment.

Briefly, referring now particularly to FIG. 16C, it will be appreciated that the first plurality of sequentially arranged links 106A may subsequently be moved back to the slacked position and removed from the environment while the second plurality of sequentially arranged links 106B remain in the tensioned position. In such a manner, a second distal end 122B of the second plurality of sequentially arranged links 106B may be positioned at a desired location and orientation within the environment and may remain there without maintaining the first extension tool 100A in position. In the event that such location and orientation within the environment is the desired endpoint, the second plurality of sequentially arranged links 106B of the second extension tool 100B may be utilized to perform desired operations (e.g., inspections, repairs, or maintenance operations).

However, it will further be appreciated that in the certain exemplary embodiments, further extension tools 100 may be utilized to reach more remote positions and/or orientations within the environment.

Specifically, referring particularly to FIG. 16D, it will be appreciated that the exemplary tool assembly 184 further includes a third extension tool 100C. The third extension tool 100C may be configured in substantially the same manner as the first extension tool 100A. For example, the third extension tool 100C may include a third plurality of sequentially arranged links 106C defining a third outer diameter 129C. The third outer diameter 129C may be substantially equal to the first outer diameter 129A. Accordingly, the third outer diameter 129C may be less than the second inner diameter 127B (of the second hollow tube 126B of the second plurality of sequentially arranged links 106B), such that the third plurality of sequentially arranged links 106C may be movable through the second hollow tube 126B of the second plurality of sequentially arranged links 106B when in the slacked position.

Notably, however, for the embodiment shown a third overall length (i.e., centerline length) of the third plurality of sequentially arranged links 106C of the third extension tool 100C (when in the tensioned position) is greater than the second overall length, and further is greater than the first overall length. In such a manner, the third extension tool 100C may reach further into the environment to position a third distal end 122C further into the environment, or more specifically, further along a nonlinear path through the environment. As will be appreciated, such a configuration may ensure the third plurality of sequentially arranged links 106C are able to navigate through a first section 188A and a second section 188B of the environment prior to being inserted in an unguided manner into a third section 188C of the environment in the slacked position.

Further, referring briefly to FIG. 16E, it will be appreciated that once the third plurality of sequentially arranged links 106C of the third extension tool 100C are moved to the tensioned position, the second extension tool 100B may be removed from the environment. The tool assembly 184 of FIG. 16 may therefore allow for various operations to be conducted at the third distal end 122C of the third extension tool 100C.

It will be appreciated, however, that the exemplary tool assembly 184 depicted in FIGS. 16A through 16E is by way of example only. For example, although the exemplary tool assembly 184 in FIG. 16A through 16E include a second extension tool 100B movable over a first extension tool 100A, in other embodiments, the second extension tool 100B may instead be movable through a first hollow tube 126A of the first extension tool 100A (and a second outer diameter of the second plurality of links 106B of the second extension tool 100B may be less than the first inner diameter 127A). Further, although three extension tools 100A, 100B, 100C are depicted, in other embodiments, the tool assembly 184 may only include two extension tools, or alternatively, may include any other suitable number of extension tools (e.g., 4, 5, 6, etc.).

Further, still, although the exemplary tool assembly 184 depicted in FIGS. 16A through 16B is discussed above as including extension tools 100 having predetermined shapes when moved to the tensioned position, such as the exemplary extension tools described above with reference to FIGS. 1 through 15, in other embodiments, one or more of the extension tools of FIGS. 16A through 16B may have any other suitable configuration. For example, in other embodiments, one or more of the extension tools 100 of the tool assembly 184 may not have a predefined shape when moved to the tensioned position. For example, referring now to FIGS. 17 and 18, FIG. 17 depicts a selectively flexible tool (or "extension tool") 100 in accordance with another exemplary embodiment of the present disclosure in a slacked position and FIG. 18 depicts the exemplary extension tool 100 of FIG. 17 in a tensioned position.

Figure 17:
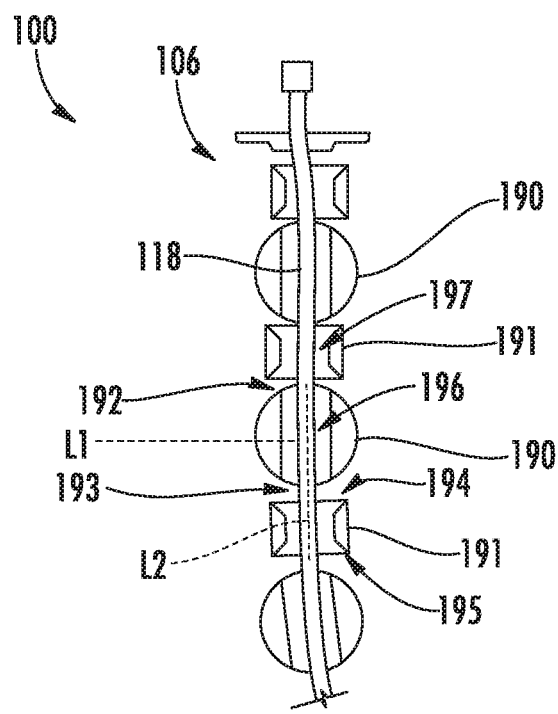
FIG. 17 is a schematic view of a selectively flexible tool in accordance with still another exemplary embodiment of the present disclosure in a slacked position.
Figure 18:
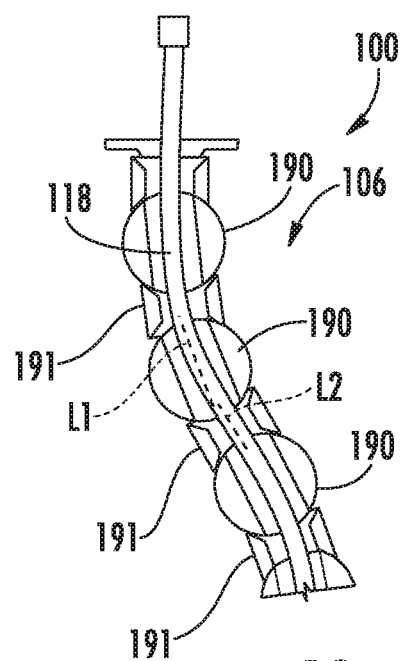
FIG. 18 is a schematic view of the exemplary selectively flexible tool of FIG. 17 in a tensioned position.

The exemplary extension tool 100 of FIGS. 17 and 18 generally includes a plurality of sequentially arranged links 106 movable between the slacked position (FIG. 17) and the tensioned position (FIG. 18). More specifically, for the embodiment shown, the plurality of sequentially arranged links 106 includes a plurality of joint members 190 and a plurality of link members 191. Each joint member 190 is positioned between adjacent link members 191. The joint members 190 are configured to allow the link members 191 to define any suitable orientation relative to one another while in the slacked position and further to retain a particular shape when moved to the tensioned position. More specifically, for the embodiment shown, the joint members 190 each extend between a first end 192 and a second end 193 along a first longitudinal direction L1 (i.e., a longitudinal direction of the respective joint member 190). For the embodiment shown, the first end and the second end 192, 193 of each joint member 190 defines a convex surface. Similarly, each link member 191 of the plurality of link members 191 extends between a first end 194 and a second end 195 along a second longitudinal direction L2 (i.e., a longitudinal direction of the respective link member 191). The first end 194 and the second end 195 of each link member 191 defines a concave opening 186 mateable with the convex surface of an adjacent joint member 190. For example, the concave opening 186 of the first end 194 of a particular link member 191 may be mateable with the convex surface of the second end 193 of an adjacent joint member 190.

More specifically, for the embodiment shown, the first and second ends 192, 193 of the joint members 190 each define a complementary shape to the first and second ends 194, 195 of each of the link members 191. For the embodiment shown, the first and second ends 192, 193 of the joint members 190 each define a rounded surface and the first and second ends 194, 195 of the link members 191 each define a rounded opening 186. More specifically still, each of the plurality of joint members 190 in the embodiment depicted define a substantially spherical shape and each of the plurality of link members 191 of the embodiment depicted define a substantially cylindrical shape.

Moreover, each of the plurality of joint members 190 defines a first longitudinal opening 196 and each of the plurality of link members 191 defines a second longitudinal opening 197. Notably, for the embodiment shown, the first longitudinal opening 196 of each joint member 190 extends through a joint member centerline of the respective joint member 190 (which extends along the first longitudinal direction L1 for the embodiment shown), and the second longitudinal opening 197 of each link member 191 extends through a link member centerline of the respective link member 191 (which extends along the second longitudinal direction L2 for the embodiment shown). However, in other embodiments, the first and/or second longitudinal openings 196, 197 may be positioned at any other suitable manner.

Further, it will be appreciated that the extension tool 100 of FIGS. 17 and 18 includes a line assembly, and more specifically, includes a line 118. The line 118 of the line assembly extends through the first longitudinal opening 196 of each joint member 190 of the plurality of joint members 190 and further extends through the second longitudinal opening 197 of each link member 191 the plurality of link members 191. The line 118 of the line assembly may be configured to move the plurality of sequentially arranged links 106 between the slacked position of FIG. 17 and the tensioned position of FIG. 18 by tensioning (e.g., shortening) and pressing the plurality of sequentially arranged links 106 against one another. Notably, it will be appreciated that while the plurality of links 106 may adapt to just about any three dimensional shape when in the slacked position (FIG. 17), the plurality of joint members 190 and/or the plurality of link members 191 define a relatively high coefficient of friction at the joints/where they contact one another. In such a manner, the plurality of sequentially arranged links 106 of the extension tool 100 may define a relatively rigid configuration when moved to the tensioned position, such that they remain in the three dimensional shape they adapted to while in the slacked position.

Accordingly, it will be appreciated that while the exemplary extension tool 100 of FIGS. 17 and 18 may be utilized in a tool assembly 184 in accordance with one or more exemplary aspects of the present disclosure, the exemplary extension tool 100 of FIGS. 17 and 18 does not define a predefined shape that it must conform to when moved to the tensioned position.

Regardless, however, referring now to FIG. 19, a tool assembly 184 is provided in accordance with another exemplary embodiment that may utilize an extension tool that does not define a predefined shape when in the tensioned position (such as the exemplary extension tool 100 of FIGS. 17 and 18). More specifically, FIGS. 19A through 19I depicted various exemplary aspects of the tool assembly 184.

It will be appreciated that the exemplary tool assembly 184 of FIGS. 19A through 19I may operate in a similar manner to the exemplary tool assembly 184 described above with reference to FIG. 16A through 16E. For example, the exemplary tool assembly 184, as is shown in FIG. 19A, includes a first extension tool 100A movable between a slacked position and a tensioned position (shown). The first extension tool 100A, although depicted in a simplified and schematic manner, may include a first plurality of sequentially arranged links 106A. The first plurality of sequentially arranged links 106A of the first extension tool 100A define a predetermined shape when in the tensioned position (shown in FIG. 19A).

Referring to FIG. 19B, the tool assembly 184 further includes a second extension tool 100B. The second extension tool 100B may similarly include a second plurality of sequentially arranged links 106B movable between a slacked position and a tensioned position (shown). The second plurality of sequentially arranged links 106B are movable over or through the first plurality of sequentially arranged links 106A, and more specifically, are movable through the first plurality of sequentially arranged links 106A. In such a manner, the second plurality of sequentially arranged links 106B may define a second outer diameter 129B that is less than a first inner diameter 127A of a first hollow tube 126A of the first plurality of links 106A.

Notably, the second extension tool 100B may be configured in a similar manner to the extension tool 100 of FIGS. 17 and 18. Accordingly, while the second extension tool 100B may not define a predetermined shape when in the tensioned position, it may take the shape of the first hollow tube 126A of the first extension tool 100A.

Therefore, the second extension tool 100B may be inserted through the first hollow tube 126A of the first plurality of sequentially arranged links 106A of the first extension tool 100A such that a second distal end 122B of the second extension tool 100B is positioned adjacent to a first distal end 122A of the first extension tool 100A. The second extension tool 100B may then be moved to the tensioned position, retaining the shape of the first extension tool 100A, and the first extension tool 100A may then be removed. Such is depicted in FIG. 19C.

Thereafter, referring to FIG. 19D, a third extension tool 100C of the tool assembly 184 may be moved over the second extension tool 100B (i.e., while in the slacked position). The third extension tool 100C may be configured in a similar manner as the first extension tool 100A (i.e., defining a third hollow tube 126C defining a third inner diameter 127C substantially equal to the first inner diameter 126A), but may define a greater overall length. In such a manner, the second extension tool 100B may guide the third extension tool 100C through the environment at least to the second distal end 122B of the second extension tool 100B. The third plurality of links 106C may then extend further into the environment and the third extension tool 100C may then be moved to the tensioned position. Referring now also to FIG. 19E, the second extension tool 100B may thereafter be moved back to the slacked position and be removed from within the third extension tool 100C and from the environment. A third distal end 122C of the third extension tool 100C may be at a desired position and orientation within the environment. Accordingly, the exemplary tool assembly 184 may facilitate inspection, repair, or maintenance operations at a location within the environment proximate the third distal end 122C.

However, in still other embodiments, the tool assembly 184 may include further extension tools to reach further, more remote locations within the environment. For example, referring to FIGS. 19F through 19I, the tool assembly 184 may further include a fourth extension tool 100D (configured in a similar manner to the second extension tool 100B, but defining a greater overall length, or more particular, defining an overall length is substantially equal to an overall length of the third extension tool 100C) and a fifth extension tool 100E (configured in a manner similar to the first extension tool 100A and third extension tool 100C, but defining a greater overall length than each of the first extension tool 100A and the third extension tool 100C).

For example, as illustrated in FIG. 19F, during operation of the exemplary tool assembly 184, the fourth extension tool 100D may be inserted through the third extension tool 100C while in a slacked position. The fourth extension tool 100D may then be moved to the tensioned position, whereby the fourth extension tool 100 retains the shape of the third extension tool 100C. As illustrated in FIG. 19G, the third extension tool 100C may then be moved to the slacked position and removed from within the environment. Further, as illustrated in FIG. 19H, the fifth extension tool 100E may be moved over the fourth extension tool 100 while in a slacked position. The fifth extension tool 100E may then be moved to the tensioned position. Referring to FIG. 19I, the fourth extension tool 100D may be moved back to the slacked position and removed from within the fifth extension tool 100E. A fifth distal end 122E of the fifth extension tool 100E is positioned at a desired position and/or orientation within the environment to facilitate, e.g., inspection, repair, and/or maintenance of one or more components within the environment proximate the fifth distal end 122E.

Further, referring now to FIG. 20, one exemplary application of the various extension tools 100 and/or tool assemblies 184 of the present disclosure will be described. Notably, although described as a tool assembly 184 in FIG. 20, it will be appreciated that in certain embodiments an individual extension tool 100/selectively flexible tool may be used. Specifically, FIG. 20 depicts a tool assembly 184 in accordance with an exemplary embodiment of the present disclosure being utilized to navigate through a nonlinear path within an environment, which for the embodiment shown is a gas turbine engine 200.

Figure 20:
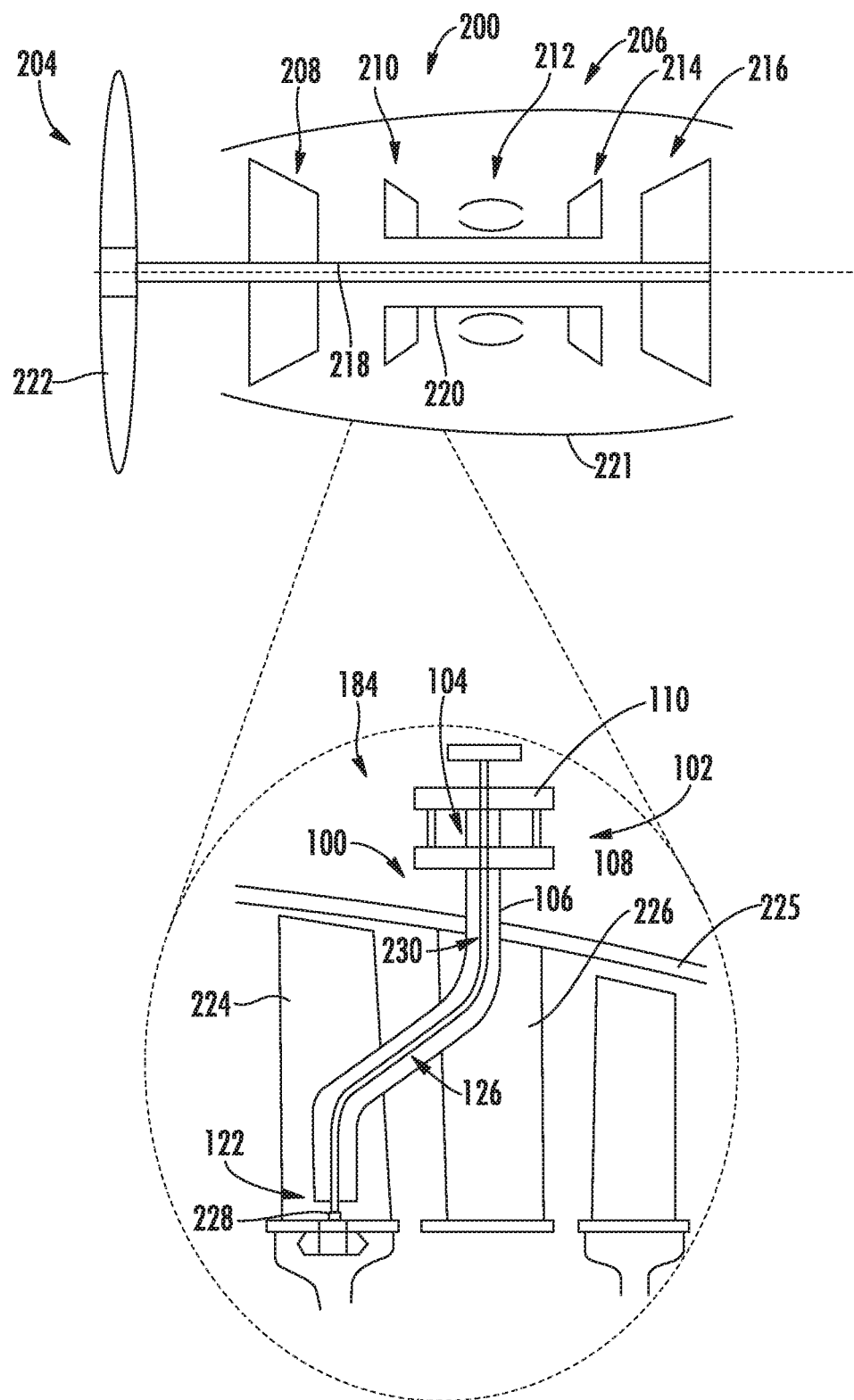
FIG. 20 is a schematic view of a gas turbine engine and extension tool in accordance with an exemplary embodiment of the present disclosure.

Specifically, for the embodiment of FIG. 20, the gas turbine engine 200 is configured as a turbofan engine. The turbofan engine generally includes a fan section 204 and a turbomachine 206.

The turbomachine 206 generally includes a compressor section having a low pressure ("LP") compressor 208 and a high pressure ("HP") compressor 210; a combustion section 212; a turbine section including an HP compressor 214 and an LP compressor 216; and an exhaust section (not shown). The compressor section, combustion section 212, turbine section, and exhaust section are each arranged in serial flow order. The LP compressor 208 and LP turbine 216 are coupled through an LP shaft 218, and similarly, the HP compressor 210 and HP turbine 214 are coupled to an HP shaft 220. Additionally, the turbomachine 26 includes a casing 221 enclosing at least in part the above-noted components of the turbomachine 206. Further, for the embodiment shown the fan section 204 includes a fan having a plurality of fan blades 222, with the fan and plurality of fan blades 222 being driven by the LP shaft 218.

In the callout Circle A, a close-up, schematic view of a compressor of the compressor section of the turbomachine 206 is depicted, and more specifically, a close-up, schematic view of the HP compressor 210 is depicted. As shown, the HP compressor 210 includes a plurality of rotating compressor rotor blades 224 (which may be coupled to, and driven by, the HP shaft 220) and a plurality of stationary guide vanes 226 positioned at least partially within a flowpath liner 225. For the embodiment shown, a radially inner end of one of the rotating compressor rotor blades 224 includes a fastener 228, which may be a bolt, screw, etc., such as a locking lug. As part of a maintenance or repair operation of the gas turbine engine 200, it may be necessary to tighten or loosen the fastener 228.

Referring still to FIG. 20, the exemplary liner 225 defines an opening 230, which may be a borescope opening. Given the proximity of the fastener 228, it will be extremely difficult to effectively tighten or loosen the fastener 228 through the opening 230 in the liner 225 using traditional tools. However, utilizing the tool assembly 184, a nonlinear path may be defined by one or more extension tools 100 to facilitate inspection, repair, or maintenance operations at the remote location of the faster 228. For example, a plurality of sequentially arranged links 106 of an extension tool 100 may be inserted through the opening 230 in a slacked position, and moved to the tensioned position using a line assembly 104. Once in the tensioned position and within the environment, or rather, within the liner 225 of the turbomachine 206, a guide tube 126 defined by the links 106 may allow for insertion of a flexible tool 232 (e.g., screwdriver, Torx wrench, Allen bit, etc.) which may be used to tighten or loosen the fastener 228 (see, e.g., FIGS. 1 through 12). Additionally, or alternatively, a multitude of pluralities of links 106 may be provided with the extension tool 100 (see, e.g., FIGS. 13 through 15), the tool assembly 184 may include multiple extension tools 100 (see, e.g., FIGS. 16 through 19), or both. Such may facilitate the inspection, repair, and/or maintenance action on the gas turbine engine 200 without removal of the liner 225 of the turbomachine 206.

Notably, the exemplary environment depicted in FIG. 20 is provided by way of example only. In other embodiments, the tool assembly 184 may be utilized to perform actions within any other suitable environment, such as other suitable locations within a gas turbine engine, other suitable engines, hazardous environments, complex machines, etc.

Figure 21:
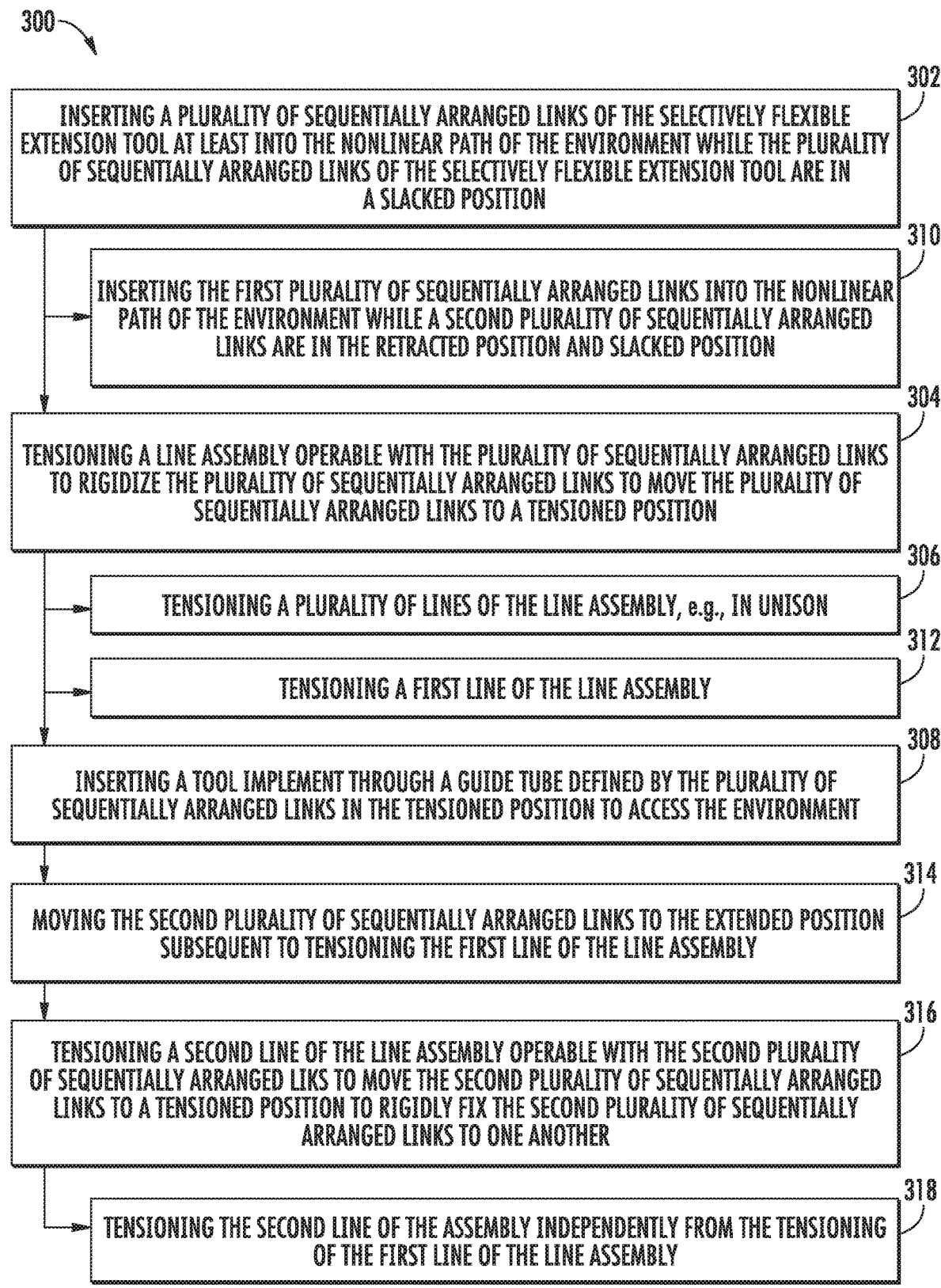
FIG. 21 is a flow diagram of a method for operating an extension tool in accordance with an exemplary aspect of the present disclosure.

Referring now to FIG. 21, a method 300 is provided for operating a selectively flexible extension tool within an environment defining a nonlinear path. The method may utilize one or more of the exemplary selectively flexible extension tools described above with reference to FIGS. 1 through 10. However, in other embodiments, any other suitable selectively flexible extension tool may be utilized.

The method 300 generally includes at (302) inserting a plurality of sequentially arranged links of the selectively flexible extension tool at least partially into the nonlinear path of the environment while the plurality of sequentially arranged links of the selectively flexible extension tool are in a slacked position.

The method 300 further includes at (304) tensioning a line assembly operable with the plurality of sequentially arranged links to rigidize the plurality of sequentially arranged links to move the plurality of sequentially arranged links to a tensioned position. For example, in certain exemplary aspects, tensioning the line assembly at (304) may include at (306) tensioning a plurality of lines of the line assembly, e.g., in unison.

Moreover, the exemplary method 300 includes at (308) inserting a tool implement through a guide tube defined by the plurality of sequentially arranged links in the tensioned position to access the environment. Inserting the tool implement through the guide tube defined by the plurality of sequentially arranged links at (308) may include performing a maintenance operation or a repair operation on a component within the environment using the tool implement.

More specifically, for the exemplary aspect depicted in FIG. 21, the plurality of sequentially arranged links of the extension tool is a first plurality of sequentially arranged links and the extension tool further includes a second plurality of sequentially arranged links. As with the first plurality of links, the second plurality of links is movable between a slacked position and a tensioned position. Further, the second plurality of links is movable between a retracted position wherein the second plurality of links is substantially nested within the first plurality of links, and an extended position wherein the second plurality of links is substantially extended from the first plurality of links. In the context of the retracted and extended position, the term "substantially" refers to more than half of the links.

As such, it will be appreciated that inserting the plurality of links at (302) includes at (310) inserting the first plurality of sequentially arranged links into the nonlinear path of the environment while the second plurality of sequentially arranged links is in the retracted position and slacked position. For the exemplary method 300 depicted, tensioning the line of the line assembly at (304) includes at (312) tensioning a first line of the line assembly and the method 300 further includes at (314) moving the second plurality of sequentially arranged links to the extended position subsequent to tensioning the first line of the line assembly at (312). At such a stage, the first plurality of sequentially arranged links are inserted into the environment and are in the tensioned position. The second plurality of sequentially arranged links have been extended from the first plurality of sequentially arranged links and may be in the slacked position to facilitate further insertion of the second plurality of links in or through a nonlinear path within the environment and/or the extension tube of the first plurality of links.

Referring still to FIG. 21, the method 300 further includes at (316) tensioning a second line of the line assembly operable with the second plurality of sequentially arranged links to move the second plurality of sequentially arranged links to a tensioned position to rigidly fix the second plurality of sequentially arranged links to one another. In such a manner, it will be appreciated that tensioning the second line of the line assembly at (316) may include at (318) tensioning the second line of the line assembly independently from the tensioning of the first line of the line assembly at (312).

Notably, although the exemplary method 300 depicted in FIG. 21 is discussed as being operable with an extension tool including two pluralities of sequentially arranged links, in other exemplary aspects, the method 300 may be utilized with an extension tool including three or more pluralities or a single plurality of sequentially arranged links (see, e.g., FIGS. 1 through 6). Further, although the exemplary method 300 depicted in FIG. 21 is discussed as being operable with an extension tool including nested pluralities of sequentially arranged links, in still other exemplary aspects, the method 300 may be utilized with an extension tool including pluralities of sequentially arranged links arranged, e.g. in series. With such an exemplary aspect, an aft end of a second plurality of sequentially arranged links may be coupled to a forward end of a first plurality of sequentially arranged links (see, e.g., FIG. 15).

It will be appreciated, however, that in still other exemplary aspects of the present disclosure, other methods may be utilized to operate various tool assemblies in accordance with various exemplary aspects of the present disclosure. For example, referring now to FIG. 22, a method 400 is provided for operating a tool assembly within an environment in accordance with an exemplary aspect of the present disclosure. The exemplary tool assembly may be configured in a manner similar to one or more of the embodiments described above with reference to FIGS. 16 through 20. However, in other embodiments, the tool assembly operated through the method 400 may be configured in accordance with any other suitable exemplary embodiment.

The method 400 includes at (402) inserting a first selectively flexible tool into the environment while the first selectively flexible tool is in a slacked position. More specifically, inserting the first selectively flexible tool into the environment at (402) includes at (404) inserting a first plurality of links of the first selectively flexible tool while the first plurality of links is in a slacked position.

The method 400 further includes at (406) moving the first selectively flexible tool to a tensioned position. More specifically, moving the first selectively flexible tool to the tensioned position at (406) includes at (408) moving the plurality of links of the first selectively flexible tool to the tensioned position, and although not depicted may further include moving the plurality of links of the first selectively flexible tool to the tensioned position using a line assembly of the first selectively flexible tool.

Additionally, the method 400 includes at (410) positioning a second selectively flexible tool at least partially over or through the first selectively flexible tool while the second selectively flexible tool is in a slacked position, and at (412) moving the second selectively flexible tool to a tensioned position. Accordingly, it will be appreciated that in at least certain exemplary aspects, positioning the second selectively flexible tool at least partially over or through the first selectively flexible tool at (410) may include at (414) positioning the second selectively flexible tool at least partially through a hollow tube of the first plurality of links of the first selectively flexible tool. However, in other exemplary aspects, positioning the second selectively flexible tool at least partially over or through the first selectively flexible tool at (410) may include at (416) positioning the second selectively flexible tool at least partially over the first plurality of links of the first selectively flexible tool, such that the first plurality of links of the first selectively flexible tool are positioned within a second hollow tube of the second selectively flexible tool.

Figure 22:
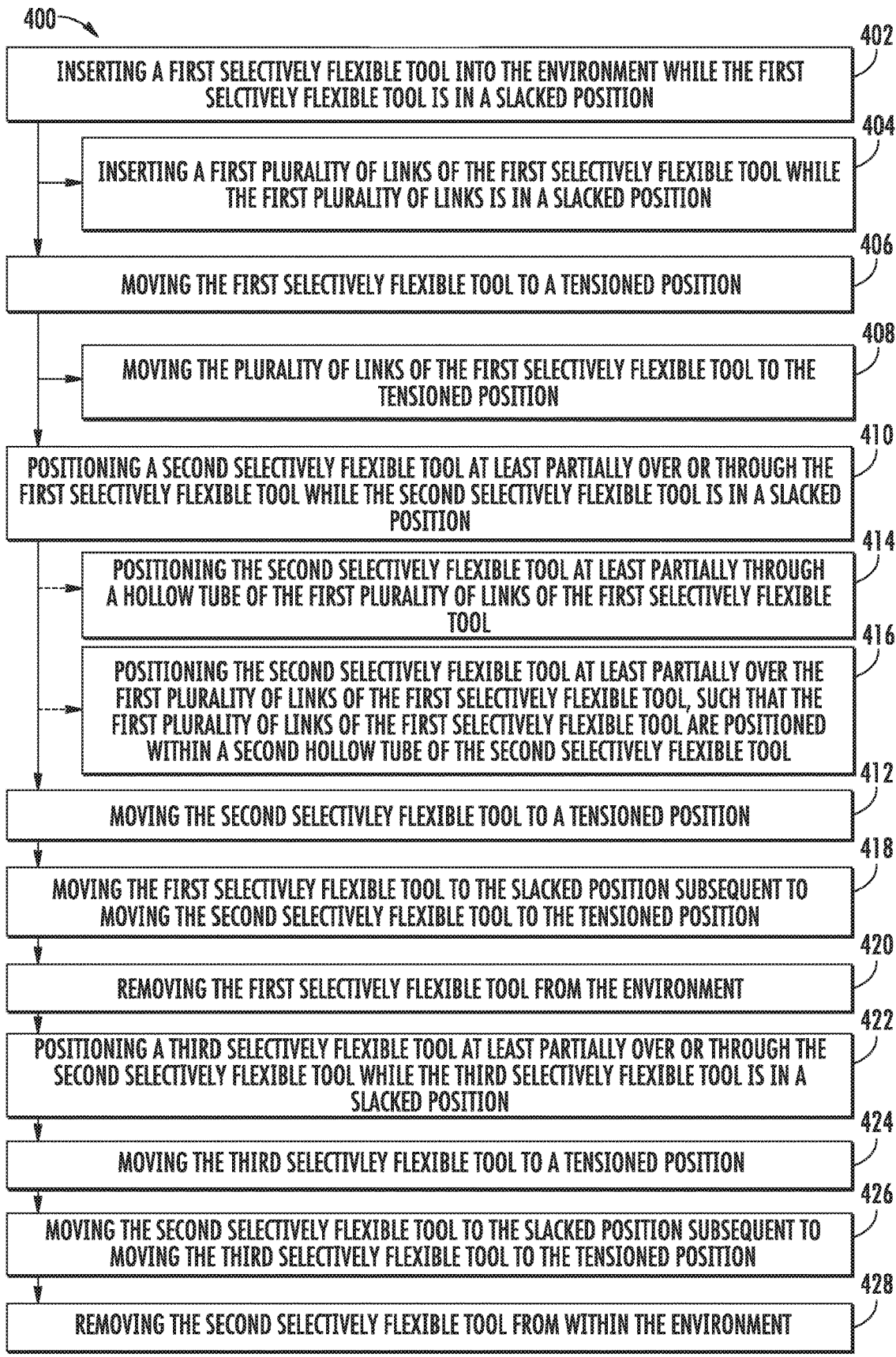
FIG. 22 is a flow diagram of a method for operating a tool assembly in accordance with an exemplary aspect of the present disclosure.

Referring still to the exemplary aspect depicted in FIG. 22, it will be appreciated that the exemplary method 400 further includes at (418) moving the first selectively flexible tool to the slacked position subsequent to moving the second selectively flexible tool to the tensioned position at (412), and further includes at (420) removing the first selectively flexible tool from the environment. Moreover, it will be appreciated that at least certain exemplary aspects of the present disclosure may utilize additional selectively flexible tools to allow the tool assembly to reach more remote locations within the environment. Accordingly, the exemplary aspect of the method 400 depicted in FIG. 22 further includes at (422) positioning a third selectively flexible tool at least partially over or through the second selectively flexible tool while the third selectively flexible tool is in a slacked position, and at (424) moving the third selectively flexible tool to a tensioned position. Further, still, the exemplary method 400 includes at (426) moving the second selectively flexible tool to the slacked position subsequent to moving the third selectively flexible tool to the tensioned position at (424), and (428) removing the second selectively flexible tool from within the environment.

Although not depicted, additional selectively flexible tools may be utilized in additional exemplary aspects of the present disclosure. Alternatively, the method 400 may utilize less selectively flexible tools.

Further aspects of the invention are provided by the subject matter of the following clauses:

A selectively flexible extension tool including: a line assembly; and a plurality of sequentially arranged links, the line assembly operable with the plurality of sequentially arranged links to move the plurality of sequentially arranged links between a slacked position and a tensioned position, the plurality of sequentially arranged links spaced from one another when in the slacked position to allow the plurality of sequentially arranged links to pivotably move relative to one another, the plurality of sequentially arranged links pressed against one another when in the tensioned position to rigidly fix the plurality of sequentially arranged links to one another.

The selectively flexible extension tool of any preceding clause, wherein the plurality of sequentially arranged links includes a first link extending between a forward end and an aft end and a second link extending between a forward end and an aft end, the forward end of the first link defining a first interface geometry, the aft end of the second link defining a second interface geometry complementary to the first interface geometry.

The selectively flexible extension tool of any preceding clause, wherein the line assembly includes a first line slidable relative to at least the first link to move the plurality of sequentially arranged links between the slacked position and the tensioned position.

The selectively flexible extension tool of any preceding clause, wherein the first link defines a first geometry, wherein the second link defines a second geometry, and wherein the first geometry and the second geometry are substantially the same.

The selectively flexible extension tool of any preceding clause, wherein the first link defines a first geometry, wherein the second link defines a second geometry, and wherein the first geometry is different than the second geometry.

The selectively flexible extension tool of any preceding clause, wherein the first interface geometry defines a circumference and comprises at least two extension members spaced along the circumference, wherein the second interface geometry also defines a circumference and comprises at least two indentions corresponding in shape to the at least two extension members.

The selectively flexible extension tool of any preceding clause, wherein the at least two extension members of the first interface geometry comprises three extension members, and wherein the at least two indentions of the second interface geometry comprises three corresponding indentions.

The selectively flexible extension tool of any preceding clause, wherein the at least two extension members of the first interface geometry are pressed within the at least two indentions of the second interface geometry when the plurality of links is in the tensioned position.

The selectively flexible extension tool of any preceding clause, further including: a biasing member operable with the first link and the second link for biasing the second link away from the first link, and wherein the line assembly is configured to overcome the biasing member when moving the plurality of links to the tensioned position.

The selectively flexible extension tool of any preceding clause, wherein the biasing member is an elastic member positioned at least partially between the first link and the second link.

The selectively flexible extension tool of any preceding clause, wherein each of the plurality of links defines an outer surface, and wherein the biasing member is a spring attached to the outer surface of the first link and the outer surface of the second link for biasing the second link away from the first link.

The selectively flexible extension tool of any preceding clause, wherein each of the plurality of links defines an outer surface, and wherein the biasing member is a spring positioned inward of the outer surface of the first link and inward of the outer surface of the second link.

The selectively flexible extension tool of any preceding clause, further including: a plurality of biasing members, wherein each biasing member is operable with a pair of adjacent links of the plurality of links for biasing the adjacent links away from one another.

The selectively flexible extension tool of any preceding clause, further including: a biasing member operable with each of the plurality of links for biasing adjacent links away from one another, wherein each of the plurality of links defines an outer surface, and wherein the biasing member is operable with the outer surface of each of the plurality of links.

The selectively flexible extension tool of any preceding clause, wherein the biasing member comprises an elastomeric material attached to the outer surface of each of the plurality of links.

The selectively flexible extension tool of any preceding clause, wherein the biasing member comprises a continuous spring member attached to the outer surface of each of the plurality of links.

The selectively flexible extension tool of any preceding clause, wherein each of the plurality of links defines a substantially similar geometry.

The selectively flexible extension tool of any preceding clause, wherein each of the plurality of links is formed through an additive manufacturing process.

The selectively flexible extension tool of any preceding clause, wherein the selectively flexible extension tool is a guide tube, and wherein the plurality of links together define a hollow tube extending therethrough.

The selectively flexible extension tool of any preceding clause, wherein the selectively flexible extension tool is a tool member further comprising a tool implement coupled to one of the plurality of links.

The selectively flexible extension tool of any preceding clause, wherein the tool implement comprises a drill, and wherein the selectively flexible extension tool comprises a flexible driveshaft extending through the plurality of links.

The selectively flexible extension tool of any preceding clause, wherein the tool implement comprises one or more sensors, a camera, or both.

The selectively flexible extension tool of any preceding clause, wherein the each of the plurality of links comprises a circumferential wall, wherein the line assembly comprises a first line, and wherein the first line of the line assembly extends through the circumferential wall of each of the plurality of links.

The selectively flexible extension tool of any preceding clause, wherein each link of the plurality of links defines a lengthwise opening in the circumferential wall, and wherein the first line of the line assembly is slidably received through the lengthwise opening of the circumferential wall of each link of the plurality of links.

The selectively flexible extension tool of any preceding clause, wherein the line assembly comprises a plurality of lines operable with the plurality of links.

The selectively flexible extension tool of any preceding clause, wherein the plurality of sequentially arranged links is a first plurality of sequentially arranged links defining a first guide tube extending therethrough, and wherein the selectively flexible extension tool further includes: a second plurality of sequentially arranged links movably positioned at least partially within the first guide tube of the first plurality of sequentially arranged links.

The selectively flexible extension tool of any preceding clause, wherein the line assembly comprises a first line operable with the first plurality of sequentially arranged links to move the first plurality of sequentially arranged links between a slacked position and a tensioned position, and a second line operable with the second plurality of sequentially arranged links to move the second plurality of sequentially arranged links between a slacked position and a tensioned position.

The selectively flexible extension tool of any preceding clause, wherein the second plurality of sequentially arranged links together define a second guide tube extending therethrough, and wherein the selectively flexible extension tool further includes: a third plurality of sequentially arranged links movably positioned at least partially within the second guide tube of the second plurality of sequentially arranged links.

The selectively flexible extension tool of any preceding clause, wherein the plurality of sequentially arranged links defines is a first plurality of sequentially arranged links defining a forward end, and wherein the selectively flexible extension tool further includes: a second plurality of sequentially arranged links coupled to the forward end of the first plurality of sequentially arranged links.

The selectively flexible extension tool of any preceding clause, wherein the line assembly comprises a first line operable with the first plurality of sequentially arranged links to move the first plurality of sequentially arranged links between a slacked position and a tensioned position, and a second line operable with the second plurality of sequentially arranged links to move the second plurality of sequentially arranged links between a slacked position and a tensioned position, and wherein the second line is operable with the second plurality of sequentially arranged links independent of the first line being operable with the first plurality of sequentially arranged links.

A method for operating a selectively flexible extension tool within an environment defining a nonlinear path including: inserting a plurality of sequentially arranged links of the selectively flexible extension tool at least partially into the nonlinear path of the environment while the plurality of sequentially arranged links of the selectively flexible extension tool are in a slacked position; and tensioning a line of a line assembly operable with the plurality of sequentially arranged links to move the plurality of sequentially arranged links to a tensioned position to rigidly fix the plurality of sequentially arranged links to one another.

The method of any preceding clause, further including: inserting a tool implement through a guide tube defined by the plurality of sequentially arranged links in the tensioned position to access the environment.

The method of any preceding clause, wherein the plurality of sequentially arranged links of the extension tool is a first plurality of sequentially arranged links, wherein the extension tool further comprises a second plurality of sequentially arranged links, wherein the second plurality of sequentially arranged links is movable between a retracted position wherein the second plurality of sequentially arranged links is substantially nested within the first plurality of sequentially arranged links and an extended position wherein the second plurality of sequentially arranged links is substantially extended from within the first plurality of sequentially arranged links, and wherein the second plurality of sequentially arranged links is further movable between a slacked position and a tensioned position.

The method of any preceding clause, wherein inserting the plurality of sequentially arranged links of the selectively flexible extension tool comprises inserting the first plurality of sequentially arranged links into the nonlinear path of the environment while the second plurality of sequentially arranged links is in the retracted position and the slacked position.

The method of any preceding clause, wherein tensioning the line of the line assembly comprises tensioning a first line of the line assembly, and wherein the method further includes: moving the second plurality of sequentially arranged links to the extended position subsequent to tensioning the first line of the line assembly.

The method of any preceding clause, wherein the method further includes: tensioning a second line of the line assembly operable with the second plurality of sequentially arranged links to rigidize the second plurality of sequentially arranged links and rigidly fix the second plurality of sequentially arranged links to one another.

The method of any preceding clause 1, wherein the plurality of sequentially arranged links of the extension tool is a first plurality of sequentially arranged links, wherein the extension tool further comprises a second plurality of sequentially arranged links, wherein the line of the line assembly is a first line of the line assembly, wherein the line assembly further comprises a second line operable with the second plurality of sequentially arranged links, and wherein the method further comprises: tensioning the second line of the line assembly to move the second plurality of sequentially arranged links to a tensioned position to rigidize the second plurality of sequentially arranged links and rigidly fix the second plurality sequentially arranged links to one another independently from the tensioning of the first line of the line assembly.

The method any preceding clause, wherein the first plurality of sequentially arranged links defines a forward end, wherein the second plurality of sequentially arranged links defines an aft end, and wherein the aft end of the second plurality of sequentially arranged links is coupled to the forward end of the first plurality of sequentially arranged links.

The method of any preceding clause, wherein the environment is a gas turbine engine, and wherein the nonlinear path is a nonlinear path from a borescope opening of the gas turbine engine to a radially inner end of a gas turbine engine component.

The method of any preceding clause, wherein the gas turbine engine component is a compressor rotor blade or a turbine rotor blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A selectively flexible extension tool comprising:
    a line assembly;
    a base operable to tension the line assembly; and
    a plurality of sequentially arranged links forming an arm, the plurality of sequentially arranged links including a first link and a second link extending between a forward end and an aft end, the forward end of the first link defining a first interface geometry, the aft end of the second link defining a second interface geometry, the line assembly operable with the plurality of sequentially arranged links to move the plurality of sequentially arranged links between a slacked position and a tensioned position, the plurality of sequentially arranged links spaced from one another when in the slacked position to allow the plurality of sequentially arranged links to pivotably move relative to one another, the plurality of sequentially arranged links pressed against one another when in the tensioned position to rigidly fix the plurality of sequentially arranged links to one another such that the first interface geometry and the second interface geometry are pressed together to form a kinematic mount that constrains the first link and the second link in all degrees of freedom, the plurality of sequentially arranged links being configured to assume only a single predetermined shape over an entire length of the arm when the arm reaches the tensioned position, the predetermined shape being previously selected by a user such that a selective engagement of the plurality of sequentially arranged links including the forward end of the first engaging with the aft end of the second link forms a final geometry and orienation of the plurality of sequentially arranged links when the plurality of sequentially arranged links reach the tensioned position.

2. The selectively flexible extension tool of claim 1, wherein the first interface geometry is complementary to the second interface geometry.

3. The selectively flexible extension tool of claim 2, wherein the line assembly includes a first line slidable relative to at least the first link to move the plurality of sequentially arranged links between the slacked position and the tensioned position.

4. The selectively flexible extension tool of claim 2, wherein the first link defines a first geometry, wherein the second link defines a second geometry, and wherein the first geometry and the second geometry are substantially the same.

5. The selectively flexible extension tool of claim 2, wherein the first link defines a first geometry, wherein the second link defines a second geometry, and wherein the first geometry is different than the second geometry.

6. The selectively flexible extension tool of claim 2, wherein the first interface geometry defines a circumference and comprises at least two extension members spaced along the circumference, wherein the second interface geometry also defines a circumference and comprises at least two indentions corresponding in shape to the at least two extension members.

7. The selectively flexible extension tool of claim 6, wherein the at least two extension members of the first interface geometry comprises three extension members, and wherein the at least two indentions of the second interface geometry comprises three corresponding indentions.

8. The selectively flexible extension tool of claim 6, wherein the at least two extension members of the first interface geometry are pressed within the at least two indentions of the second interface geometry when the plurality of sequentially arranged links is in the tensioned position.

9. The selectively flexible extension tool of claim 2, further comprising:
    a biasing member operable with the first link and the second link for biasing the second link away from the first link, and wherein the line assembly is configured to overcome the biasing member when moving the plurality of sequentially arranged links to the tensioned position.

10. The selectively flexible extension tool of claim 9, wherein the biasing member is an elastic member positioned at least partially between the first link and the second link.

11. The selectively flexible extension tool of claim 9, wherein each of the plurality of sequentially arranged links defines an outer surface, and wherein the biasing member is a spring attached to the outer surface of the first link and the outer surface of the second link for biasing the second link away from the first link.

12. The selectively flexible extension tool of claim 9, wherein each of the plurality of sequentially arranged links defines an outer surface, and wherein the biasing member is a spring positioned inward of the outer surface of the first link and inward of the outer surface of the second link.

13. The selectively flexible extension tool of claim 2, wherein the first link extends between a forward end and an aft end in a first longitudinal direction and the second link extending between a forward end and an aft end in a second longitudinal direction, and wherein the second link moves relative to the first link such that an angle defined between the second longitudinal direction and the first longitudinal direction varies.

14. The selectively flexible extension tool of claim 1, further comprising:
a plurality of biasing members, wherein each biasing member is operable with a pair of adjacent links of the plurality of sequentially arranged links for biasing the adjacent links away from one another.

15. The selectively flexible extension tool of claim 1, further comprising:
a biasing member operable with each of the plurality of sequentially arranged links for biasing adjacent links away from one another, wherein each of the plurality of sequentially arranged links defines an outer surface, and wherein the biasing member is operable with the outer surface of each of the plurality of sequentially arranged links.

16. The selectively flexible extension tool of claim 15, wherein the biasing member comprises an elastomeric material attached to the outer surface of each of the plurality of sequentially arranged links.

17. The selectively flexible extension tool of claim 15, wherein the biasing member comprises a continuous spring member attached to the outer surface of each of the plurality of sequentially arranged links.

18. The selectively flexible extension tool of claim 1, wherein each of the plurality of sequentially arranged links defines a substantially similar geometry.

19. The selectively flexible extension tool of claim 1, wherein each of the plurality of sequentially arranged links is formed through an additive manufacturing process.

20. The selectively flexible extension tool of claim 1, wherein the selectively flexible extension tool is a guide tube, and wherein the plurality of sequentially arranged links together define a hollow tube extending therethrough.

21. The selectively flexible extension tool of claim 1, wherein the selectively flexible extension tool is a tool member further comprising a tool implement coupled to one of the plurality of sequentially arranged links.

22. The selectively flexible extension tool of claim 21, wherein the tool implement comprises a drill, and wherein the selectively flexible extension tool comprises a flexible driveshaft extending through the plurality of sequentially arranged links.

23. The selectively flexible extension tool of claim 21, wherein the tool implement comprises one or more sensors, a camera, or both.

24. The selectively flexible extension tool of claim 1, wherein each of the plurality of sequentially arranged links comprises a circumferential wall, wherein the line assembly comprises a first line, and wherein the first line of the line assembly extends through the circumferential wall of each of the plurality of sequentially arranged links.

25. The selectively flexible extension tool of claim 24, wherein each link of the plurality of sequentially arranged links defines a lengthwise opening in the circumferential wall, and wherein the first line of the line assembly is slidably received through the lengthwise opening of the circumferential wall of each link of the plurality of sequentially arranged links.

26. The selectively flexible extension tool of claim 1, wherein the line assembly comprises a plurality of lines operable with the plurality of sequentially arranged links.

27. The selectively flexible extension tool of claim 1, wherein the plurality of sequentially arranged links is a first plurality of sequentially arranged links defining a first guide tube extending therethrough, and wherein the selectively flexible extension tool further comprises:
a second plurality of sequentially arranged links movably positioned at least partially within the first guide tube of the first plurality of sequentially arranged links.

28. The selectively flexible extension tool of claim 27, wherein the line assembly comprises a first line operable with the first plurality of sequentially arranged links to move the first plurality of sequentially arranged links between a slacked position and a tensioned position, and a second line operable with the second plurality of sequentially arranged links to move the second plurality of sequentially arranged links between a slacked position and a tensioned position.

29. The selectively flexible extension tool of claim 27, wherein the second plurality of sequentially arranged links together define a second guide tube extending therethrough, and wherein the selectively flexible extension tool further comprises:
a third plurality of sequentially arranged links movably positioned at least partially within the second guide tube of the second plurality of sequentially arranged links.

30. The selectively flexible extension tool of claim 1, wherein the plurality of sequentially arranged links defines is a first plurality of sequentially arranged links defining a forward end, and wherein the selectively flexible extension tool further comprises:
a second plurality of sequentially arranged links coupled to the forward end of the first plurality of sequentially arranged links.

31. The selectively flexible extension tool of claim 30, wherein the line assembly comprises a first line operable with the first plurality of sequentially arranged links to move the first plurality of sequentially arranged links between a slacked position and a tensioned position, and a second line operable with the second plurality of sequentially arranged links to move the second plurality of sequentially arranged links between a slacked position and a tensioned position, and wherein the second line is operable with the second plurality of sequentially arranged links independent of the first line being operable with the first plurality of sequentially arranged links.

32. The selectively flexible extension tool of claim 1, wherein the plurality of sequentially arranged links is a first plurality of sequentially arranged links, and wherein the selectively flexible extension tool further comprises:
a second plurality of sequentially arranged links; and,
wherein, when in the tensioned position, the first plurality of sequentially arranged links being configured to assume only a first single predetermined shape, the first single predetermined shape being previously selected by the user so as to form a first final geometry of the first plurality of sequentially arranged links, and wherein the second plurality of sequentially arranged links being configured to assume only a second predetermined shape, the second predetermined shape being previously selected by the user so as to form a second final geometry of the second plurality of sequentially arranged links.

33. The selectively flexible extension tool of claim 32, wherein the line assembly includes a first line and a second line, the first line operable with the first plurality of sequentially arranged links to move the first plurality of sequentially arranged links between the slacked position and the tensioned position, and the second line operable with the second plurality of sequentially arranged links to move the second plurality of sequentially arranged links between the slacked position and the tensioned position.

34. The selectively flexible extension tool of claim 32, wherein the first predetermined shape has a different curvature than the second predetermined shape.

35. The selectively flexible extension tool of claim 1, wherein the first interface geometry includes at least one extension member and the second interface geometry including at least one indentation, the at least one extension member received by the at least one indentation to form the kinematic mount.

36. The selectively flexible extension tool of claim 1, wherein the line assembly comprises a plurality of lines that extend a length of the selectively flexible extension tool in a first direction and loop around to extend a length of the selectively flexible extension tool in a second direction opposite the first direction.

37. A selectively flexible extension tool comprising:
a line assembly;
a base including a first body and a second body, the second body directly coupled to the line assembly, the base operable to tension the line assembly by moving the second body towards or away from the first body; and
a plurality of sequentially arranged links forming an arm, the line assembly operable with the plurality of sequentially arranged links to move the plurality of sequentially arranged links between a slacked position and a tensioned position, the plurality of sequentially arranged links spaced from one another when in the slacked position to allow the plurality of sequentially arranged links to pivotably move relative to one another, the plurality of sequentially arranged links each including an exterior circumferential wall defining an outer rim at each end of each link, the plurality of sequentially arranged links pressed against one another such that exterior outer rims of adjacent links are aligned and in direct contact and surfaces of adjacent interface geometries are completely engaged when in the tensioned position to rigidly fix the plurality of sequentially arranged links to one another.

38. The selectively flexible extension tool of claim 37, wherein the first body is a first plate, and wherein the second body is a second plate.

39. The selectively flexible extension tool of claim 37, wherein the base further includes at least one extension guide fixedly coupled to the first body, and wherein the second body is slidable along the at least one extension guide.

40. A selectively flexible extension tool comprising:
a line assembly;
a base operable to tension the line assembly; and
a plurality of sequentially arranged links forming an arm, the line assembly operable with the plurality of sequentially arranged links to move the plurality of sequentially arranged links between a slacked position and a tensioned position, the plurality of sequentially arranged links spaced from one another when in the slacked position to allow the plurality of sequentially arranged links to pivotably move relative to one another, the plurality of sequentially arranged links pressed against one another when in the tensioned position to rigidly fix the plurality of sequentially arranged links to one another, the plurality of sequentially arranged links taking a predefined shape over an entire length of the arm, wherein two adjacent links of the plurality of sequentially arranged links include a short side at a first circumferential position and a long side at a second circumferential position, and wherein pairing the two adjacent links in a first position relative to each other forms a first predefined shape and pairing the two adjacent links in a second position relative to each other forms a second predefined shape.

* * * * *

UNITED STATES PATENT AND TRADEMARK OFFICE
CERTIFICATE OF CORRECTION

PATENT NO. : 12,194,620 B2
APPLICATION NO. : 16/577268
DATED : January 14, 2025
INVENTOR(S) : Andrew Crispin Graham Page 1 of 1

It is certified that error appears in the above-identified patent and that said Letters Patent is hereby corrected as shown below:

In the Claims

In Column 34, Claim 1, Line 1, delete "first" and insert -- first link --, therefor.

In Column 34, Claim 1, Line 3, delete "orienation" and insert -- orientation --, therefor.

Signed and Sealed this
Eighth Day of April, 2025

Coke Morgan Stewart
*Acting Director of the United States Patent and Trademark Office*